Aug. 6, 1968  J. O. ANDERSON ET AL  3,396,391
TERRAIN-FOLLOWING SYSTEM

Filed Dec. 20, 1963

INVENTORS
JAMES O. ANDERSON
DAVID ROSENSTOCK
CHARLES L. VEHRS

Roy N. Pitts
ATTORNEY

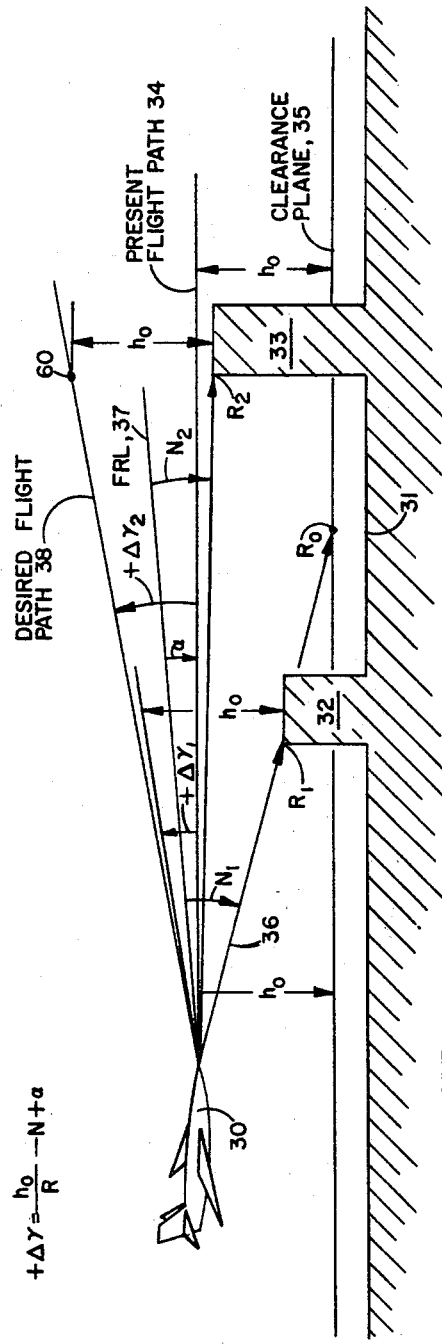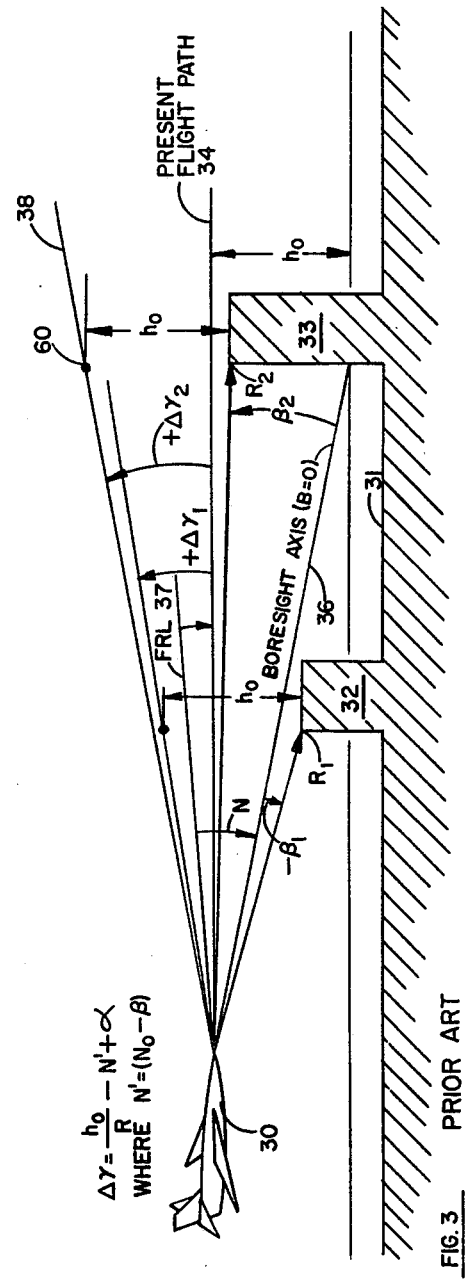
FIG. 2 PRIOR ART
FIG. 3 PRIOR ART

INVENTORS
JAMES O. ANDERSON
DAVID ROSENSTOCK
CHARLES L. VEHRS

ATTORNEY

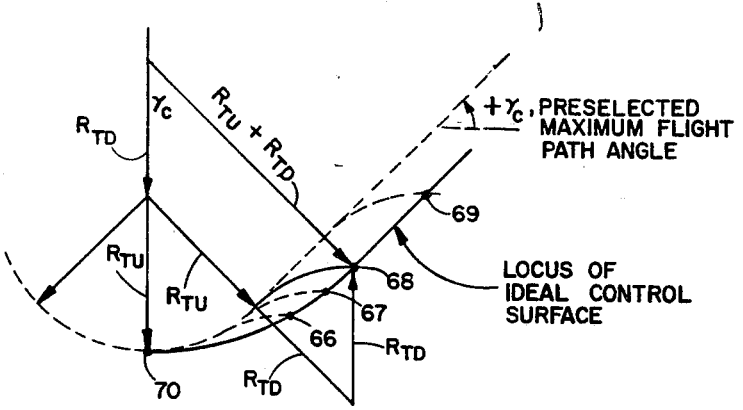
FIG. 9
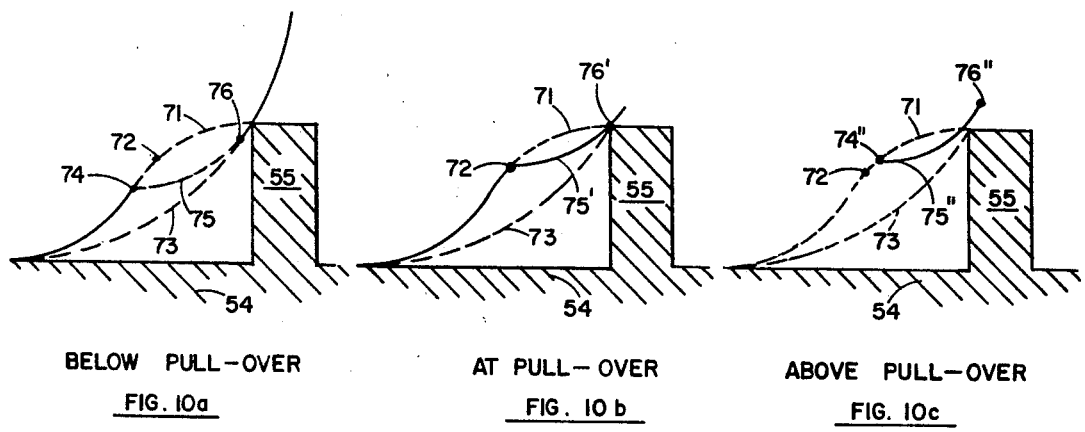
BELOW PULL-OVER
FIG. 10a
AT PULL-OVER
FIG. 10b
ABOVE PULL-OVER
FIG. 10c

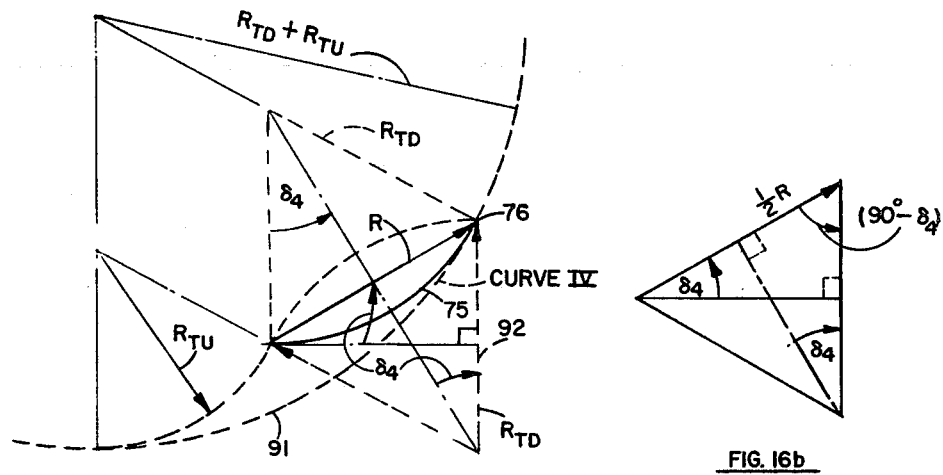
FIG. 16a
FIG. 16b
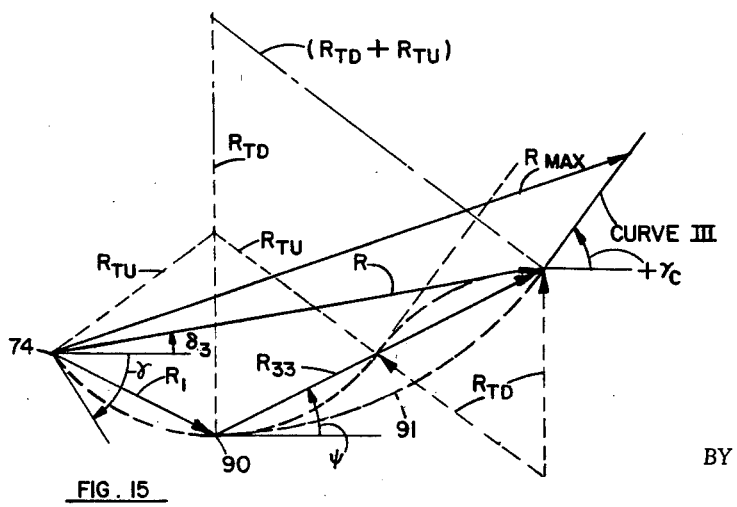
FIG. 15

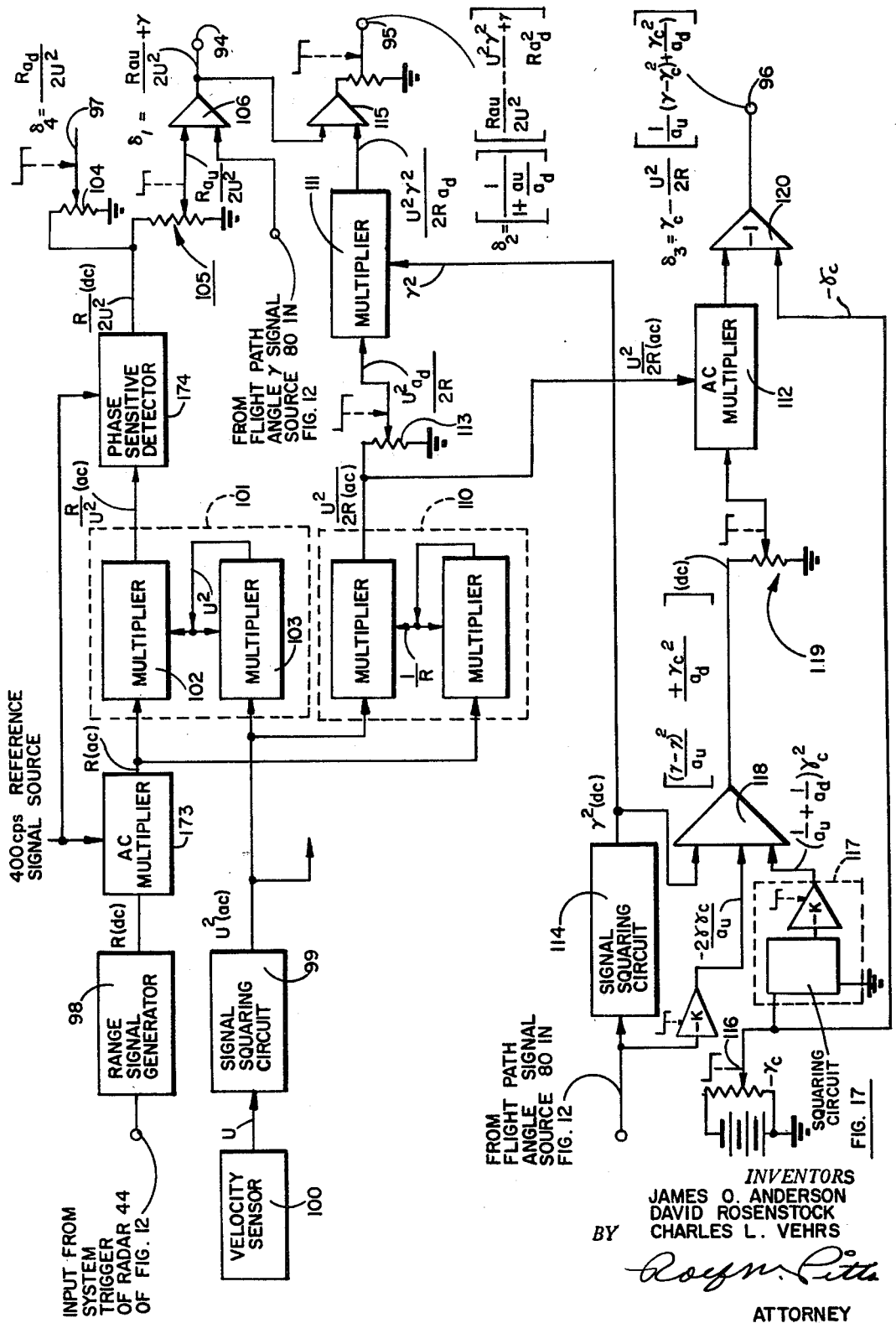

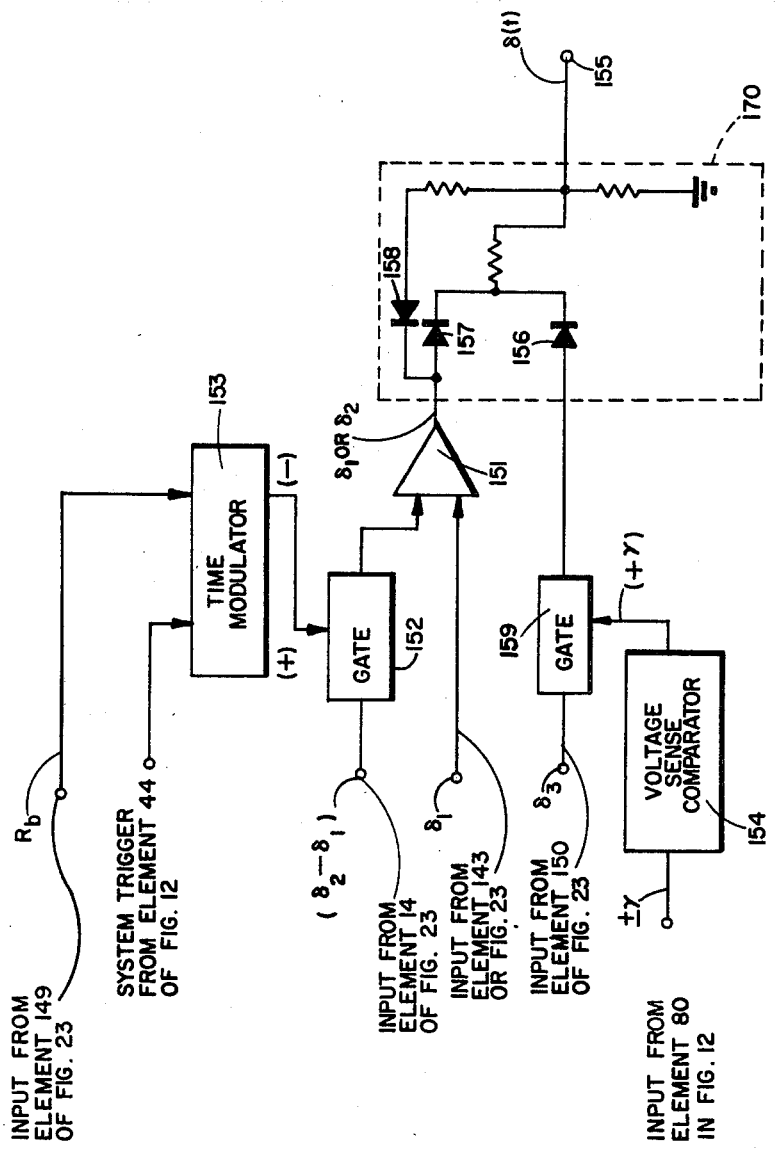

United States Patent Office 3,396,391
Patented Aug. 6, 1968

3,396,391
TERRAIN-FOLLOWING SYSTEM
James O. Anderson, Fullerton, David Rosenstock, Norco, and Charles L. Vehrs, Anaheim, Calif., assignors to North American Rockwell Corporation, a corporation of Delaware
Filed Dec. 20, 1963, Ser. No. 332,996
24 Claims. (Cl. 343—7)

The subject invention relates to a terrain-following system, and more particularly to improved means for computing a reference flight path for terrain-following airborne vehicles.

With the advent of modern radar systems for use in both offensive and defensive armaments systems, the tactics of airborne military vehicles have necessarily changed. In order for an airborne military vehicle to penetrate deep into a hostile or enemy territory and effectively conduct a military mission, it is required that the vehicle or aircraft fly as low as possible in order to avoid detection by ground-based radar installations. In flying such a low-altitude flight profile, the flight path of the aircraft would desirably follow the profile of the terrain, so as to minimize exposure of the aircraft to a ground-based radar. The safe performance of such a flight profile has employed forward-looking airborne radar means for detecting terrain obstacles at sufficient advance ranges as to allow the pilot or autopilot to evasively maneuver and avoid such obstacles.

Such prior art terrain avoidance radar systems have included means for measuring the vertical angle between the terrain obstacle and the vehicle path, and means for computing a desired vertical clearance angle in order to provide a preselected vertical clearance distance between the terrain obstacle and the vehicle. By comparing the measured or observed clearance angle with the computed or reference angle, the system provides an indication of the required angular deviation in the flight path vector, and may be employed in conjunction with the pitch attitude controller of an aircraft or missile, in order to achieve automatic terrain avoidance. Such a system is described, for example, in U.S. application Ser. No. 221,653, filed Aug. 29, 1962, for a Monopulse Receiver System, by James A. Moulton, assignor to North American Aviation, Inc., assignee of the subject invention. Such a device indicates the maximum or peak angular deviation from among the several angular deviations computed for several associated terrain obstacles lying along the azimuth direction of the vehicle flight path. In this way the desired flight path angle of the vehicle is constantly adjusted so as to assure at least a minimum clearance over all terrain obstacles in view.

Such a computed flight path as that described in connection with the computation of a peak maneuver angle, while providing terrain avoidance, does not necessarily provide optimum terrain-following so as to minimize altitude exposure of the vehicle to detection and increase the offensive pentration capabilities of the military mission employing such vehicles. Instead, the vehicle may perform altitude overshoots over certain terrain, and hover in altitude over certain dips in terrain, thereby increasing the extent both of the exposure altitude and the duration thereof.

Accordingly, the concept of the invention relates to improved terrain following apparatus whereby the performance limits of the vehicle are more fully employed, so that the probability of detection of the aircraft is reduced.

In a preferred embodiment of the invention there is provided an airborne forward-looking radar system, including means for providing information concerning the slant range and direction of a terrain obstacle relative to the vehicle in which said radar is installed. There is also provided means responsive to said range and direction for generating control signals for maneuvering a vehicle at preselected maximum maneuver limits of normal acceleration and flight path angle, whereby flight control means responsive to the generated signal may control the aircraft in accordance therewith.

By means of the above described arrangement, a signal input to the flight control coupler for initiating a maximum pull-up maneuver is generated as a function of a minimum range from an obstacle to be avoided. Also, a signal input to the flight control means is provided for initiating a maximum pull-over maneuver as a function of a minimum range from the extremity of such terrain obstacle. Further, such pull-up and pull-over maneuvers are limited to preselected climb and dive angles determined from flight-safety considerations. Hence, terrain-following performance is improved, in that the magnitudes of vertical overshoots above obstacles to be avoided and the duration of a maximum altitude exposure of a terrain-following vehicle are reduced.

Accordingly, it is a general object of the invention to provide improved terrain-following radar apparatus for airborne use.

It is another object of the invention to provide means for improving the safety and reliability of the automatic terrain-following mode of an aircraft control signalling means.

It is still another object of the subject invention to provide a terrain-following radar system which minimizes the distance amount and the time duration of altitude overshoot performance by a terrain-following vehicle utilizing such radar.

It is yet another object of the subject invention to provide radar data processing means which more fully utilize the maneuver limit performance of a utilizing vehicle control system to improve the automatic terrain-following performance of such vehicle control system.

It is a further object of the subject invention to provide means for computing an optimum flight path reference for an aircraft as a function of preselected aircraft maneuver limits for improved terrain-following.

It is still a further object of the subject invention to provide means for computing a signal indicative of the deviation between the actual flight path of an aircraft and an optimized flight path for terrain following.

These and other objects of the subject invention will become apparent from the following specification, taken together with the accompanying drawings in which:

FIG. 2 is an illustration of the on-boresight geometry of the prior radar terrain-avoidance problem;

FIG. 3 is an illustration of the off-boresight geometry of the prior art terrain-avoidance problem;

FIG. 9 is an illustration of the pull-up control surface sythesized by the device of the invention;

FIGS. 10a, 10b and 10c are illustrations of the pull-over control surface concept of the invention;

FIG. 15 is an illustration of the geometry of curve III of FIG. 11;

FIGS. 16a and 16b are illustrations of the geometry of curve IV of FIG. 11;

FIG. 17 is a block diagram of the delta-signal generator of FIG. 12;

FIG. 19 is a block diagram of the range signal generator of FIG. 12;

FIG. 22b is an illustration of the geometry of FIG. 21a;

FIG. 23 is an illustration of an alternate embodiment of the signal generator means of FIG. 17; and FIG. 24 is an illustration of an alternate embodiment of the signal logic means of FIG. 17 adapted for cooperation with the device of FIG. 23.

In the figures, like reference characters refer to like parts.

Figure 1A:
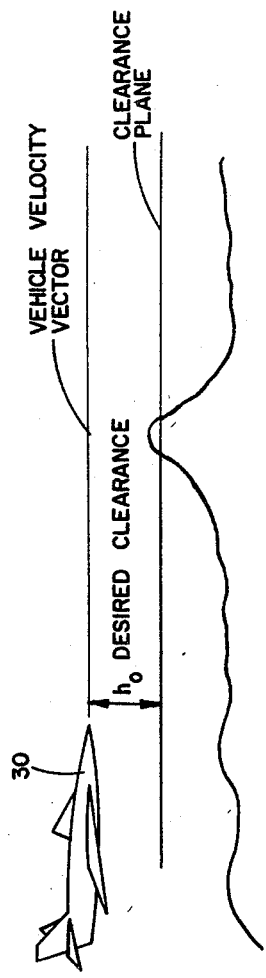
FIGS. 1a and 1b are illustrations of exemplary prior art terrain-avoidance clearance-plane techniques.
Figure 1B:
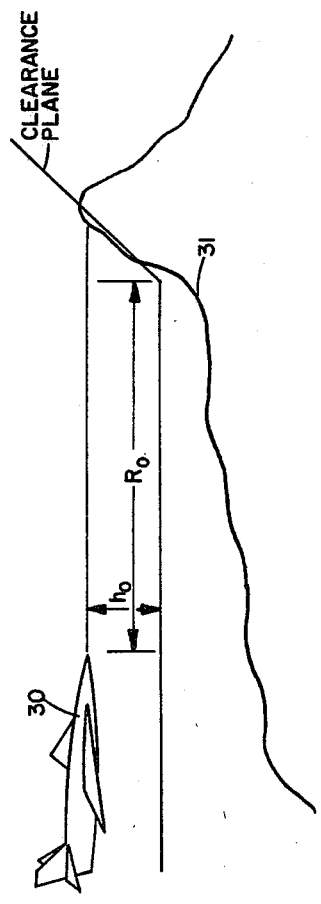

In general, prior art terrain-avoidance systems have provided means for generating a warning signal only when a terrain obstacle has been observed to protrude through a fixed-shape clearance plane, the clearance plane defining a desired clearance between a terrain obstacle and a vehicle over, and in close proximity to, such terrain. Such fixed clearance planes have been synthesized by blanking signals or bias signals which prevent the generation of a warning signal in response to the sensing of a terrain obstacle lying below the synthesized clearance plane. Such clearance plane may be of several combinations of selected fixed shapes and orientations, some of which combinations of orientation and shape are shown in FIG. 1. For example, the clearance plane may be that parallel to and beneath the flight path (or velocity vector) of the vehicle, as shown in FIG. 1a. Such combination is particularly useful in a terrain-avoidance radar system, in that such clearance is related to the projection of the vehicle's present flight path or velocity vector. Alternatively, a fixed-shape clearance-plane resembling a ski-toe, may be used, as shown in FIG. 1b. Such fixed-shape ski-toe is located at a fixed range $R_0$, ahead of the vehicle, and is intended to delay the appearance or protrusion of a terrain obstacle until the vehicle is nearer, in order to limit the tendency of the vehicle to prematurely "leave the deck" or rise in altitude in response to the occurrence of a terrain obstacle along the flight path. However, none of the above-described fixed clearance plane techniques provides a control signal enabling optimum terrain-following control of a vehicle, the performance of which is limited only by preselected maneuver-limits of the vehicle. Instead, the terrain-following performance provided by terrain avoidance systems employing such fixed clearance planes does not enable the vehicle to follow the terrain as closely and safely as the maneuver-limits of the vehicle would permit.

Such limited terrain-following performance of prior-art terrain-avoidance radar systems is described more fully hereinafter in terms of both an on-boresight type radar data processor and an off-boresight radar data processor, in connection with FIGS. 2 and 3.

Referring now to FIG. 2, there is illustrated the geometry of the prior-art terrain avoidance problem for an on-boresight type radar. An on-boresight type radar is one employing an extremely narrow beamwidth whereby the receiver is sensitive only to signal sources (i.e., ground returns of terrain) lying upon the boresight or centerline of the antenna beamwidth.

In FIG. 2 is illustrated an aircraft 30 flying above terrain 31 which presents two terrain obstacles, 32 and 33 lying along the direction of the forward flight path and protruding above a preselected height, $h_0$, below the flight path 34 ahead of the vehicle. The preselected vertical distance, $h_0$, represents a preselected or minimum vertical clearance desired to be maintained by the aircraft relative to a flat clearance plane 35 parallel to the aircraft flight path 34, and $R_1$ represents the distance or radar range from the aircraft 30 to the first terrain obstacle 32, measured along the boresight axis 36 of the narrow beam antenna of an airborne radar system.

The angle, N, represents the declination of the antenna boresight 36 relative to the fuselage reference line (FRL) 37 of the aircraft, and may be either variable (as in the case of a "nodding" or vertically scanning type antenna) or fixed. The angle $\alpha$ represents the aircraft angle-of-attack, or the inclination of the FRL 37 to the actual flight path or velocity vector 34 of the aircraft. For purposes of convenience, the exemplary flight path 34 shown has been selected to be horizontal (e.g., $\gamma=0$); however, the actual flight path is not so limited and the flight path angle, $\gamma$, may be of any desired inclination relative to the horizontal.

Hence, the angle $(N-\alpha)$ represents the inclination of the antenna boresight axis relative to the flight path of the aircraft. The nominal range of values for $(N-\alpha)$ is selected to provide an intersection of the boresight axis 36 with the clearance plane 35 at a range $R_0$ which allows sufficient maneuvering margin or distance within which the aircraft may be controlled so as to avoid a terrain obstacle, while at the same time providing adequate system angular resolution. For example, an intersection range of about 10 miles has been employed for clearance heights of 250 feet.

Such vertical angle of the desired flight path relative to the antenna boresight axis may be expressed in radians by the small angle approximation, $h_0/R_0$; and is observed to increase as the actual range R of the detected terrain obstacle decreases.

The desired flight path 38 of the prior art terrain avoidance system is described in FIG. 2 as a straight line connecting the aircraft to a point 60 vertically above the intersection of the antenna boresight axis with the terrain, the vertical distance thereof corresponding to the desired vertical clearance distance, $h_0$. It is to be appreciated from inspection of FIG. 2 that the vertical angle $+\Delta\gamma_1$ indicates the inclination difference of such desired flight path relative to the actual flight path or velocity vector of the aircraft. It is further apparent that the vertical angle of such desired flight path relative to the antenna boresight axis is a function of the distance or slant-range $R_1$ measured along the boresight axis, as well as being a function of the desired clearance distance, $h_0$.

Accordingly, the maneuver angle $+\Delta\gamma$ by which the actual flight path must be increased in order to assure a preselected terrain clearance distance, $h_0$, may be expressed as follows:

$$\Delta\gamma = \frac{h_0}{R} - N + \alpha \quad (1)$$

Although a fixed antenna declination angle, $N_0$, may be used in connection with an on-boresight data processor, such a system configuration provides only limited information concerning the terrain. For example, a larger second terrain obstacle 33 may lie at a greater range $(R_2)$ along the direction of the flight path, and viewable at a less negative (or even at a positive) vertical angle ($N_2$) requiring the execution of even a larger maneuver angle $$(+\Delta\gamma_2 > +\gamma_1)$$

for terrain avoidance. In other words, the use of a fixed antenna angle ($N_0$) in combination with an on-boresight data processor provides only limited terrain information, whereas a nodding antenna would enable such on-boresight data processor to provide terrain-profile information over the range of antenna angles employed.

An alternate example of the prior-art terrain avoidance geometry, employing off-boresight data processing, is shown in FIG. 3.

Referring to FIG. 3, there is illustrated the geometry of the prior-art terrain avoidance situation for a radar system (such as a monopulse radar) for processing ground return data occurring either on-boresight or off-boresight. The only distinction of significance between such a system and an on-boresight data processor is the addition of the angular term, $\beta$, locating the vertical angular position of the terrain obstacle within the antenna beamwidth and relative to the antenna boresight axis 36. Hence it is to be seen (from the inspection of FIG. 3), that the expression of Equation 1 for describing the maneuver angle $\Delta\gamma$ is modified for a monopulse receiver (or other device for processing off-boresight target angle information) as follows:

$$\Delta\gamma = \frac{h_0}{R} - N_0 + \alpha + \beta = \frac{h_0}{R} - N' + \alpha \qquad (2)$$

where the value of $\beta$ may be of either negative or positive sense and of a finite magnitude including zero, which latter special value corresponds to the on-boresight data processing case. In other words, in FIG. 5, the angle, $N' = (N_0 - \beta)$, corresponds to the angle, N, of FIG. 2.

Hence, although a preselected minimum clearance would be maintained over the protruding terrain obstacle 32 in FIGS. 2 and 3, yet for the strip of terrain lying between the aircraft 30 and the terrain obstacle 32, a clearance distance is maintained which is in excess of the minimum clearance distance desired, whereby the probability of detection of the craft by ground observers is increased. Such result obtains from the prior art terrain avoidance systems, regardless of whether on-boresight or off-boresight data processing is used.

In prior-art terrain avoidance mechanizations, a peak detector is employed to peak-detect, or determine the peak value of $\Delta\gamma$ for a plurality of terrain obstacles lying along the direction of the flight path, and "seen" by the radar to protrude through the flat (albeit, inclined) clearance plane. In this way, an adequate "cue" or $+\Delta\gamma_{MAX}$ indication is provided to enable adequate clearance of the "worst" (and therefore of all) of the terrain obstacles thus viewed. Such mechanization is described, for example in the above-mentioned co-pending U.S. application Ser. No. 221,653, filed Aug. 29, 1962. Control is provided, in such prior art, to only peak positive changes in flight path angle, and not necessarily to both upward and downward maximum acceleration maneuvers. In such system, the pilot or automatic flight control system tracks upward or positive terrain avoidance (0 to $+\Delta\gamma$ signals), but receives no downward or ($-\Delta\gamma$) signals. Instead, in the absence of a positive terrain avoidance signal, control must be sought by alternate means such as, for example, an altimeter. Hence, unnecessarily large clearance distances are maintained over the lesser terrain obstacles in view, thereby increasing the probability of detection of the aircraft and reducing its offensive penetration capabilities. In other words, the mechanization of Equations 1 and 2 above by on-boresight and off-boresight radar data processors, respectively, provides a terrain avoidance feature having limited utility for terrain-following functions.

Ideally, in an offensive penetration mission, an aircraft would precisely follow a terrain profile at a minimum yet safe height over the terrain so as to avoid radio towers, telephone lines and like hazards to low level flight or "hedge-hopping." However, the required vertical response in following the changes in terrain elevation imposed by the usual forward speed of the aircraft over the terrain would represent continuous normal accelerations or load factors exceeding the limits of pilot comfort, if not exceeding the structural limits of the aircraft.

Such acceleration phenomenon can be of two gross types: small, frequently-occurring changes of terrain altitude; and large, infrequent changes of altitude (which latter effect would represent a mountain or a great valley, for example). The required large accelerations resulting from avoiding large changes in terrain are easily appreciated. It is also to be appreciated that small terrain changes occurring with rapid periodicity or high frequency result in accelerations which increase as the square of the frequency. For example, for a given amplitude ($\Delta X$) of a periodic terrain change having a frequency of occurrence, $\omega$:

$$\ddot{X}(t) = \Delta X \sin \omega t \qquad (3)$$

Hence, the acceleration ($\ddot{X}$) is the double derivative of the displacement, $X(t)$:

$$\ddot{X} = \frac{d(dx)}{dt} = -\omega^2 \Delta X \sin \omega t \qquad (4)$$

Substituting Equation 3 into Equation 4:

$$\ddot{X}_{max} = \omega^2 \Delta X \qquad (5)$$

Hence, it is to be appreciated that for a periodic change in terrain height, the corresponding vertical acceleration-varies as the square of the frequency of such change. For small rapidly occurring changes in observed terrain, no dangerous terrain obstacle would be presented to the vertical flight path. However, the attempts to "follow" such terrain-changes could well induce dangerous normal accelerations in the vehicle flight path which would exceed the structural limits of the vehicle.

One way of coping with such effect or appearance (i.e., the acceleration of the surface of uneven terrain due to the high forward speed of a terrain-following aircraft) is to filter the high frequency data occurring due to small terrain anomalies of short distances apart, while maintaining an adequate (say, 250 feet) clearance height above such terrain. Such filtering may be accomplished by means of high-frequency attenuating networks in the data processor or flight control system; or the relatively slow dynamic response of the aircraft-being-controlled, itself, may effectively filter or attenuate such high frequency data as to avoid such high acceleration terrain-following maneuvers. Hence, the aircraft would fly at a mean height above the terrain ripple, which height is selected to minimize contact with hard-to-see hazards to low-level flight.

The means of coping with accelerations required by terrain obstacles of substantial extent or size, such as mountain ranges, relates to the concept of the subject invention. Such terrain-following accelerations do not arise from high frequency data but from the size of the obstacle, and therefore involve accelerations of low frequency or extended duration, similar to performing a climb or dive maneuver. However, in a practical case, the actual flight profile needs be adjusted so that the resulting normal accelerations are within the limits specified either from pilot comfort considerations or structural limits of the aircraft, while at the same time maintaining an adequate vertical clearance distance over the terrain. Of course, in the case of an unmanned vehicle, such as a guided missile, the factor of pilot comfort poses no limit on the system performance. In other words, a terrain avoidance system would be required, in which the clearance plane is continuously adapted or shaped relative to the terrain to be cleared, which shape would include the effects of the maneuver limits of the vehicle, as well as of the clearance distance to be maintained.

Figure 4:
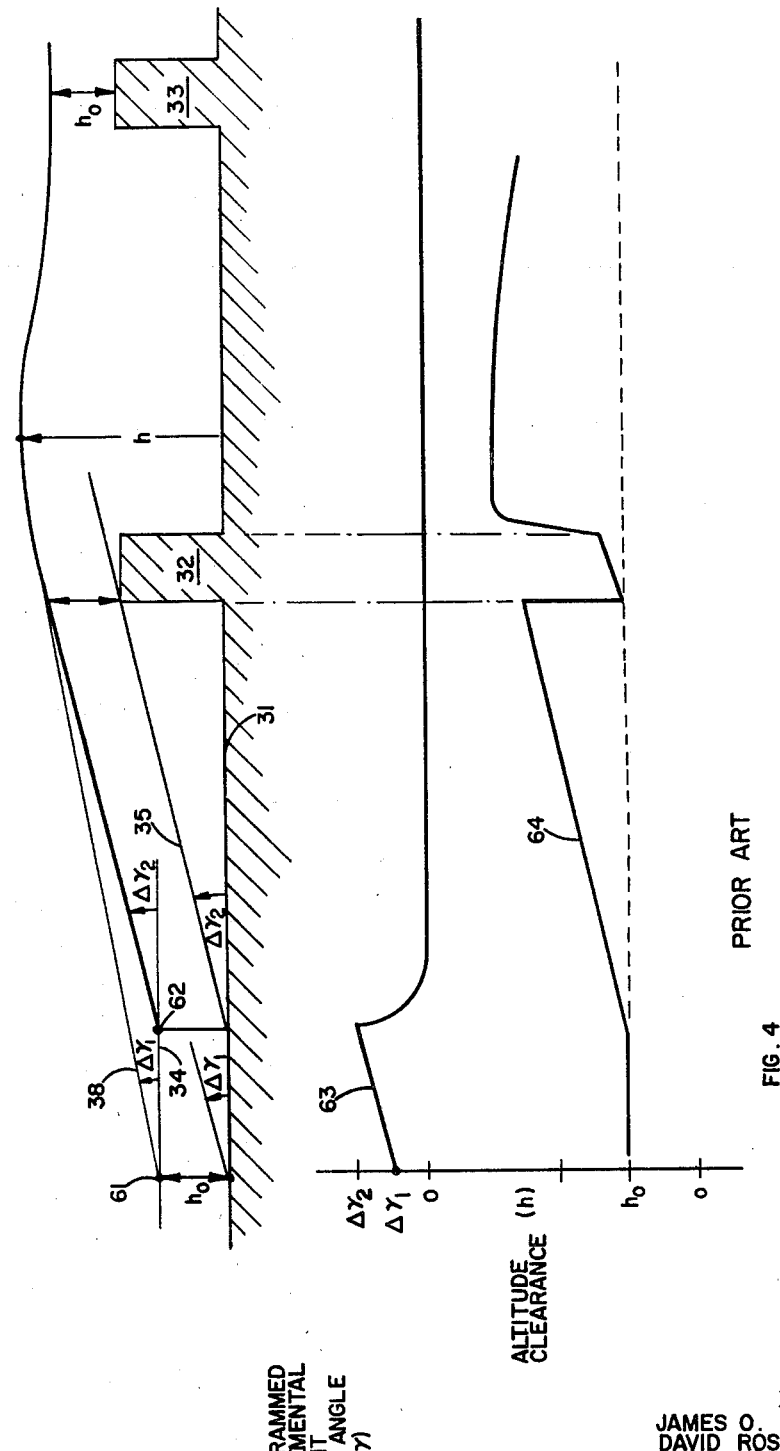
FIG. 4 is an illustration of the flight profile performance of a prior art terrain-avoidance control system.
Figure 5:
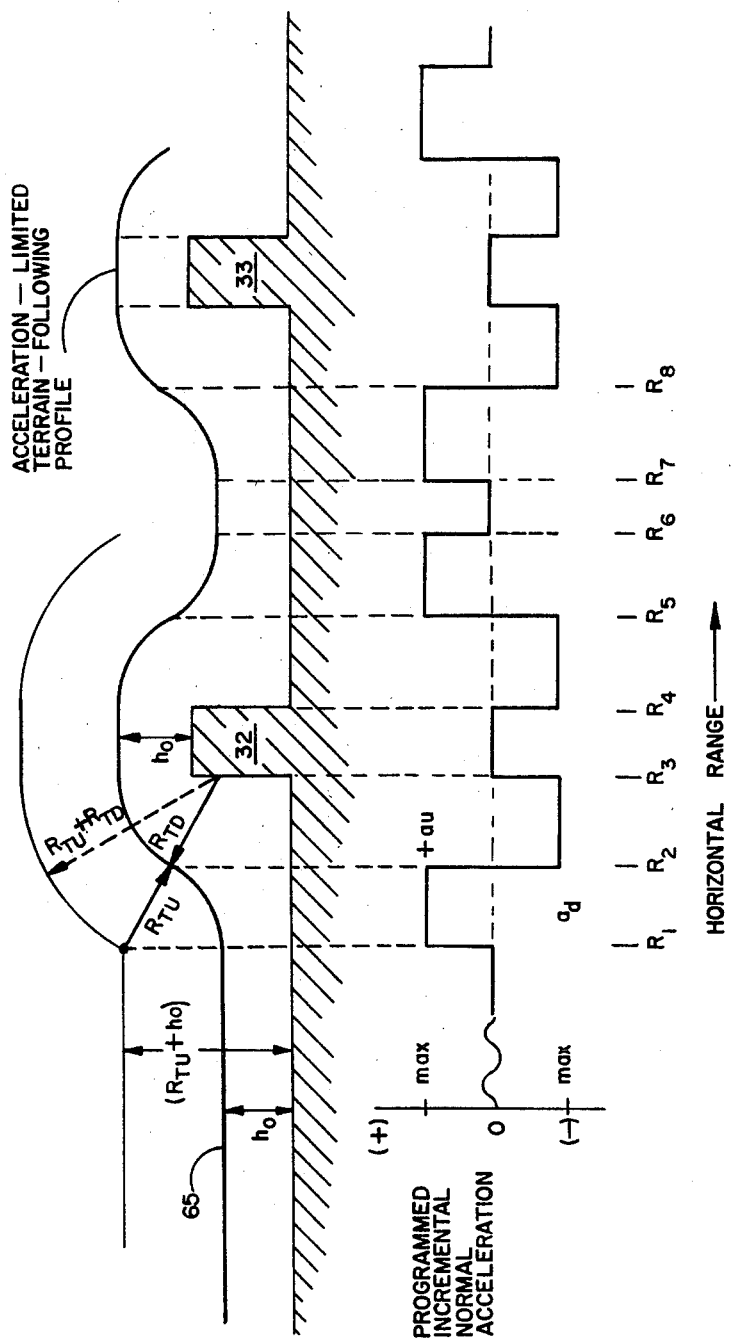
FIG. 5 is an illustration of an ideal acceleration limited terrain-following flight profile.

A comparison of an acceleration-limited, maximum-maneuver terrain-following profile and a typical prior art terrain avoidance profile is provided by FIGS. 4 and 5.

Referring to FIG. 4, there is illustrated a terrain avoidance profile 31, effected by the mechanization of either of Equations 1 and 2. There is described a flat, level terrain demonstrating two "worst" (abrupt, rectangular shaped) terrain obstacles 32 and 33, of like height and substantially located apart along the azimuth direction of an intended flight path.

Consider an aircraft located at position 61, at the preselected clearance distance $h_0$ above the level terrain (and below the height of the terrain obstacles 32 and 33) and engaged in level flight (line 34).

For a terrain-avoidance type radar data processor, the indicated maneuver signal would be $(+\Delta\gamma_1)$, computed in accordance with Equation 2, above. The associated flight path commanded by such terrain-avoidance system would be described by line 38, inclined at angle $(+\Delta\gamma_1)$ to the present flight path. If the aircraft continued on its original flight 34 path until it had progressed to point 62, located at the preselected vertical clearance distance $h_0$ over terrain 31, such terrain avoidance type radar data processor would compute an incremental maneuver angle, $+\Delta\gamma_2$, which is shown by curve 63 to increase as the aircraft approaches the terrain obstacle. If the aircraft then maneuvers by the amount $+\Delta\gamma_2$, it will clear the obstacle 32 by the desired distance $h_0$, with the clearance plane 35 inclined at an angle $+\Delta\gamma_2$. Because the clearance plane is inclined, the terrain forward of first terrain obstacle 32 is no longer under surveillance, and no quantitative maneuvering "cues" are provided by the terrain avoidance system. When the pilot levels-off the vehicle flight path, the vehicle will approach the second obstacle at the desired clearance altitude, whereby an excess clearance distance $(h-h_0)$ is maintained for the terrain lying between the two obstacles as shown by curve 64.

Where, however, a flight path or trajectory is computed as a function of preselected maximum acceleration limits, an improved flight path may be achieved for terrain-following purposes, as indicated by the flight profile shown in FIG. 5.

Where a vehicle having a constant (scalar) forward velocity, U, undergoes a pitching maneuver whereby the incremental normal acceleration $A_n$ induced thereby (i.e., induced normal to the flight path) is maintained at a preselected value, a turning radius $R_T$ developed, the relation between which parameters is as follows:

$$\Delta A_n = \frac{U^2}{R_T} \quad (6)$$

or $$R_T = \frac{U^2}{\Delta A_n} \quad (7)$$

In FIG. 5, curve 65 represents an improved or ideal terrain-following flight profile performed by conducting in succession a specified maximum pull-up maneuver and then a pull-down maneuver, the series being initiated at a range distance determined by the climb and turning radii $R_{TU}$ and $R_{TD}$, respectively. The pull-down or push-over maneuver is continued until the vehicle is at the desired clearance distance over the plateau of the terrain obstacle to be cleared and then a substantially zero incremental load factor maneuver is maintained. At the other side or edge of the terrain obstacle the pull-down or push-over maneuver is resumed. Then, after a suitable time, the pull-up maneuver is executed and the aircraft trimmed to zero incremental load factor to follow the level terrain until the next terrain obstacle is encountered. For the rectangularly shaped terrain obstacle selected, that portion of the ideal trajectory immediately on either side of the obstacle is seen to be the mirror image of the portion on the other side thereof.

The maneuver portion of the trajectory is constructed in FIG. 5, by locating a point in the terrain obstacle vertically below the desired clearance point by an amount equal to the push-over maneuver turning radius $R_{TD}$ and striking a concave arc of a circle, employing the distance $R_{TD}$ as the radius thereof. Next, the origin of radius $R_{TU}$ is located so as to allow the generation of a convex arc of radius $R_{TU}$ which is tangent to both the projected preselected clearance distance $h_0$ over the level terrain and the concave arc described by radius $R_{TD}$. (For purposes of exposition, the width or horizontal extent of rectangular terrain obstacles 32 and 33 may be ignored, without affecting the principle involved.) By means of such geometric construction, it is to be seen that the maximum acceleration pull-up maneuver would be initiated at a target of range $(R_3-R_1)$ (being less than the maximum range employed by the continuously computed terrain avoidance function), and that the push-over maneuver is computed at a lesser range, $(R_3-R_2)$.

From an examination of Equation 7, it is to be appreciated that the radii of FIG. 5 are reduced as the vehicle speed U is reduced or the preselected incremental acceleration limits are increased. Such reduction in the turn-radii would also serve to increase the maximum climb and dive angle performance of the maximum acceleration maneuver.

It is to be observed that the example illustrated in FIG. 5 involves an altitude excursion which is considerably less than the sum of the pull-up and push-over turning radii, $R_{TU}$ and $R_{TD}$, respectively, for which the maximum slope or inclination, $\gamma$, of the ideal flight path occurs at the point of tangency of the respective arcs generated by radii $R_{TU}$ and $R_{TD}$.

If, however, the necessary altitude excursion were equal to, or exceeded, the sum of $R_{TU}$ and $R_{TD}$, it is to be appreciated that the maximum inclination, $\gamma$, at such point of tangency would be 90°, or describe a vertical slope. Such a condition represents an undesired or impractical flight path in a practical case. Further, a lesser altitude excursion might yet require a maximum flight path angle, $\pm\gamma$ maximum, in excess of the performance limits of a selected aircraft or airborne vehicle. In such event, the ideal terrain-following geometry illustrated in FIG. 5 would be revised to include such flight path angle limitation.

It is to be further observed that the turning radius $(R_{TU})$ for the pull-up maneuver is normally less than that $(R_{TD})$ for the push-over maneuver, due to the difference in allowable pull-up acceleration, relative to push-over accelerations, caused by the bias effect of gravity. For example, if the structure of the vehicle has a structural limit of, say 3g's, corresponding to an acceleration equal to the effect of three times the gravity vector, then in straight and level flight, the maximum allowable incremental acceleration due to a pull-up maneuver would be $(3-1)$ or 2g's. In the push-over maneuver, where the force of gravity tends to relieve or oppose accelerations induced by such maneuver, the maximum allowable incremental acceleration (for the 3g structure limit example above) would be $(3+1)$ or 4g's. Hence, the associated radius $(R_{TD})$ for the larger allowable push-over maneuver would be shorter than that $(R_{TU})$ for the maximum allowable pull-up maneuver. However, the radii $R_{TD}$ and $R_{TU}$ have been illustrated as being equal in FIG. 5 only for convenience in the geometric construction. Where considerations of human comfort or safety impose incremental load factor limits less than those imposed by the structural limits of a manned vehicle, such lesser acceleration limits would be employed.

The effect of climb-angle limiting is shown in FIGS. 6a and 6b.

Referring to FIGS. 6a and 6b, there is illustrated the geometry of an acceleration-limited terrain-following trajectory, including the addition of climb angle limiting. There is described in FIG. 6a a first and second terrain anomaly 32 and 33 representing mesas or tablelands of successively increased height, either of which may occur in the course of the terrain-following mission depicted in FIG. 6a. For the nominal height of first terrain obstacle 32 (being somewhat less than the sum of radii $R_{TD}$ and $R_{TU}$) a maximum slope or maximum climb angle (at the point of tangency of $R_{TD}$ and $R_{TU}$ for obstacle 32) of only nominal value is required, being less than a maximum allowable climb angle ($+\gamma_c$). Accordingly, the radar range $R_1$ at which the maximum "g" terrain-following maneuver is initiated is determined only as a function of the radii ($R_{TD}$ and $R_{TU}$) and the terrain altitude difference or anomaly $h_1$.

In the case of the second terrain obstacle 33 in FIG. 6a, presenting a substantial terrain anomaly (relative to the sum of $R_{TD}$ and $R_{TU}$), it is to be appreciated that the required maximum climb angle could well exceed the allowable maximum climb angle, in the absence of climb-angle limiting. The inclusion of climb-angle limiting serves to limit the response to a maximum pull-up acceleration signal, requiring a longer range distance in which to perform (e.g., from which to initiate) the terrain-following maneuver, as seen more clearly in FIG. 6b.

Such climb-angle limiting would appear to resemble the ski-toe type clearance plane of FIG. 1b, but for the significant difference that the concept of the invention employs range-programming of the ski-toe. In other words, tthe concept of the invention computes the minimum slant-range (to the terrain obstacle to be avoided) at which a maximum maneuver is to be performed for maintaining at least a minimum terrain clearance, while attempting to follow the terrain-profile. Although the concept of maneuver limitation has been described in connection with maximum climb angle ($+\gamma_{max}=\gamma_c$) limitation of a maximum pull-up acceleration ($+\Delta A_{n_{max}}=a_u$) maneuver, such concept is readily understood to similarly apply to maximum dive angle limitation ($-\gamma_{max}=\gamma_D$) of a maximum push-over acceleration ($-\Delta A_{n_{max}}=a_d$) maneuver.

Figure 7:
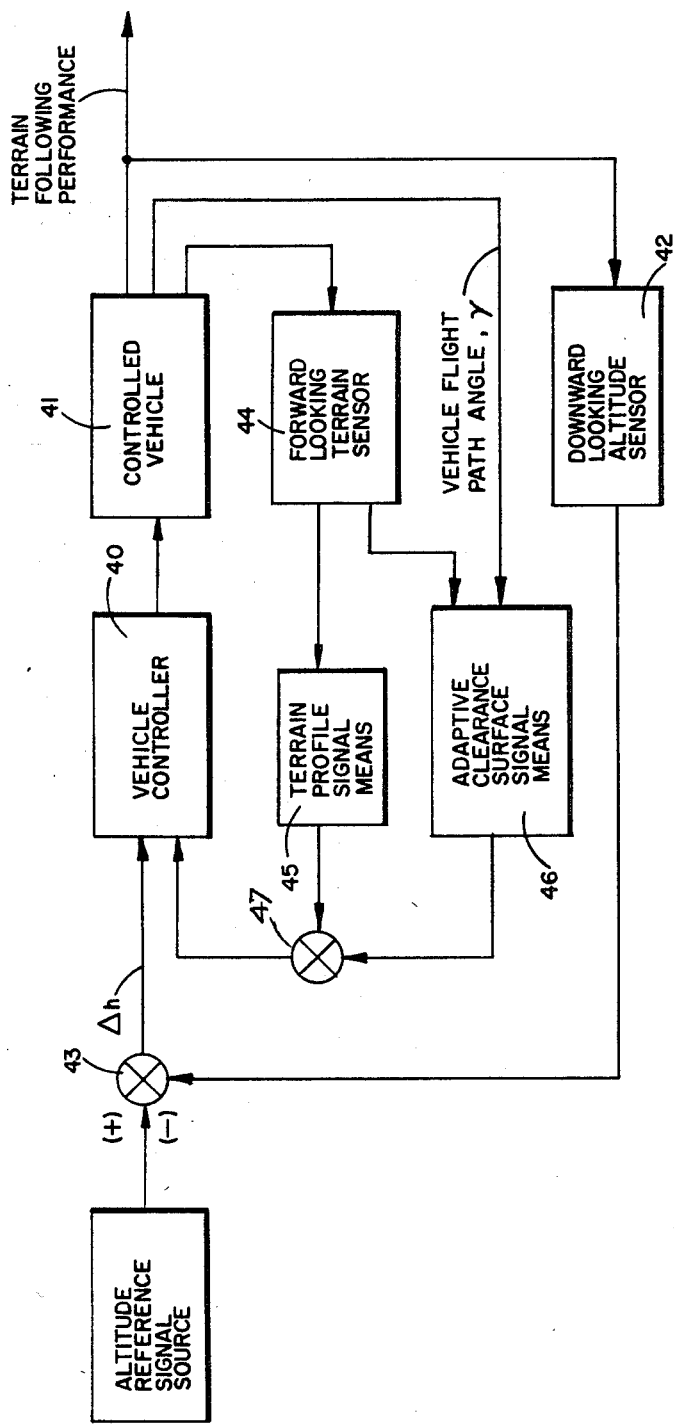
FIG. 7 is a block diagram of a system employing the concept of the invention.

A requirement for such push-over or dive maneuver may arise from the drop-off or dip of the terrain under the vehicle or behind the limited field of view of the forward-looking terrain sensor. Therefore, a downward looking sensor, such as a radar altimeter may be required in practicing the invention, in order to provide surveillance of the terrain nearest or under the vehicle, as shown in FIG. 7. In addition to vehicle flight path angle limiting and acceleration limiting, the design of a practical system will include allowances for acceleration-rate ($dA_n/dt$) limiting and transient response characteristics of the controlled vehicle. Such effects serve to increase the minimum ranges at which the pull-up maneuver is performed, similarly as does climb angle limiting.

Referring to FIG. 7, there is illustrated a closed loop vehicle control system employing a concept of the invention. There is provided a vehicle controller 40, controlled vehicle 41, and an altitude sensor 42 in closed loop cooperation as an altitude control system, as is well-understood in the art. The controlled vehicle may be an aircraft or other vehicle operated in close proximity to, and above, a terrain obstacle which is to be avoided; and the controller may be an automatic flight controller or autopilot or like means known in the art for controlling a vehicle in response to a control signal. Accordingly, elements 40 and 41 are shown in block form only. Altitude sensor 42 may be a downward looking radar or other means well-known in the art for measuring the height of a vehicle above terrain, and is therefore shown in block form only.

The altitude signal provided by sensor 42 is compared with an altitude reference signal by signal comparison means 43 to provide a control signal indicative of the difference therebetween. Such control signal may be employed by controller 40. However, such control arrangement is not wholly adequate for terrain-following control of a high-speed vehicle because adequate forward range terrain profile data is not provided, whereby the vehicle is enabled to successfully maneuver so as to both follow, and safely avoid, the terrain profile. Accordingly, a forward-looking terrain sensor 44 in cooperation with a terrain-profile signal means 45 for providing signals indicative of the terrain profile in a desired direction such as, for example, parallel to the projected flight path ahead of controlled vehicle 41 (and displaced therefrom a perpendicular distance, $h_0$). The construction and arrangement of forward-looking sensor 44 and terrain profile signal means 45 are taught in co-pending U.S. application 221,653, filed by James A. Moulton on Aug. 29, 1962 (for an off-boresight data processor) and in co-pending U.S. application 19,959 filed by William S. Burdic and Robert O. Case on April 4, 1960 (for an on-boresight data processor). Accordingly, elements 44 and 45 are shown in FIG. 7 in block form only.

There is further provided adaptive clearance surface signal means 46 responsive to forward-looking sensor 44 and the flight path angle of vehicle 41 for generating signals indicative of preselected maneuver limits of controlled vehicle 41. Signal combining means 47 combines the outputs of the terrain profile generator 45 and the adaptive clearance surface signal means 46 to provide a terrain-following control signal indicative of the difference between the sensed terrain profile and the synthesized maneuver-limited clearance plane. Such control signal is fed to the vehicle controller 40 for automatic control of the controlled vehicle 41, in such a sense as to tend to reduce the magnitude of, or oppose the sense of, the difference signal. Alternatively, such control signal may be fed to a display device or other indicator means, whereby a pilot or human operator may be enabled to manually control a controlled vehicle in order to effectively and safely perform a terrain-following mission.

The construction and arrangement of adaptive clearance surface signal means 46 is described more fully hereinafter, and is therefore shown in block form for convenience only in FIG. 7.

The concept of comparing an observed terrain-profile with a maneuver-limited clearance-surface in order to generate a terrain-following signal may be better understood by reference to FIG. 8.

Figure 8A:
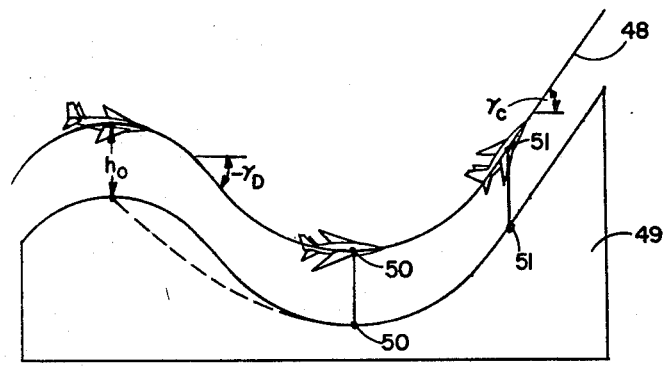
FIGS. 8a, 8b and 8c are illustrations of the effect of the flight path angle upon the control surface synthesized by the device of the invention.

Referring to FIG. 8a there is illustrated a maneuver-limited flight profile 48 of an aircraft. The curved profile is comprised of successively tangentially contiguous curved sections, a first section describing a push-over maneuver indicative of a preselected push-over maneuver or incremental acceleration normal to the flight path, a second section indicative of a preselected pull-up maneuver or incremental acceleration normal to the flight path, the common tangent to both sections having a slope described by the preselected maximum dive flight path angle, $-\gamma_D$. The terminal section of the flight path is tangent to the second, having a slope described by a predetermined maximum climb flight path angle, $+\gamma_C$.

Displaced beneath the maneuver-limited flight profile by a desired clearance distance, $h_0$, is a template 49 similarly shaped as the flight profile and representing a desired clearance plane or reference surface. Alternatively, the reference clearance path 49 may be shaped to have a turn-down radius shorter than the maneuver-limited turn-down radius by the desired clearance distance, $h_0$, and a turn-up radius longer than the maneuver-limited turn-up radius by a like amount, $h_0$. However, the template 49 has been drawn as parallel to flight path 48 and vertically displaced therefrom by the amount, $h_0$, for convenience. Also, the maximum length of the terminal tangent section (of slope, $+\gamma_c$) is preselected for reasons which will be more fully explained hereinafter. Further, although the template has been drawn as a continuous curve, such template could alternatively be constructed as a series of straight line segments approximating such curve.

Such clearance plane template is generated or synthesized in the device of the invention as a function of the flight angle, $\gamma$ of the aircraft. In other words, that portion of template 49 which is generated in front of the aircraft is that portion commencing with the flight path of the aircraft. For example, if the aircraft were flying a horizontal flight path ($\gamma=0$), with a pull-up acceleration, then the clearance plane generated in front of the aircraft would correspond to that section to the right of point 50 on template 49, and originating under the aircraft as shown relative to the vehicle in FIG. 8a.

If the aircraft were in a climb, then the clearance profile originating under the aircraft and projecting forward of the aircraft would correspond to the sector to the right of point 51, as shown relative to the vehicle in FIG. 8a. If the airplane is in a dive, then that portion of template 49 is generated which originates at a dive flight path angle corresponding to the dive flight path angle of the aircraft.

Figure 8B:
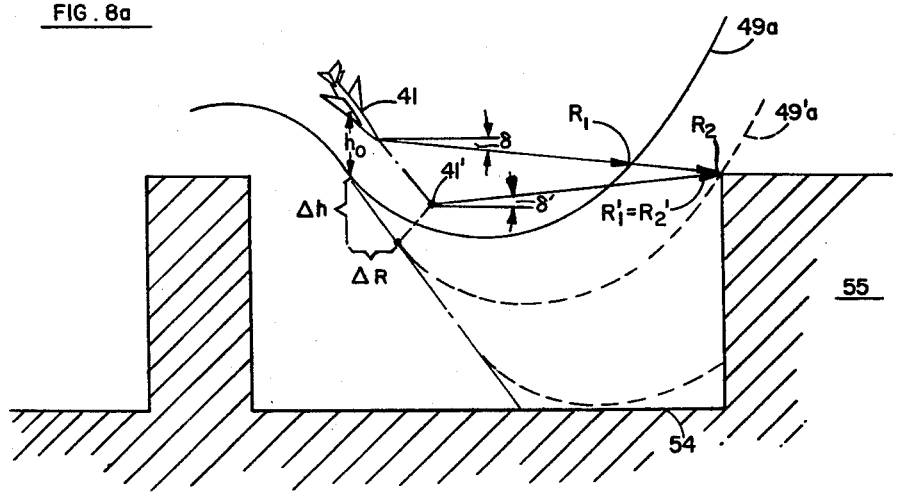
Figure 8C:
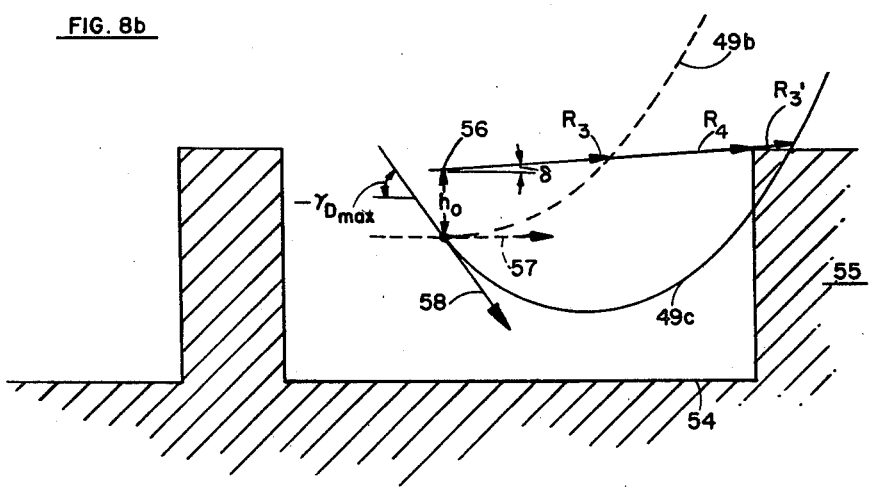

The maneuver-limited clearance plane is compared with the terrain-profile forward of the airplane to generate terrain-following control signals, as may be more easily understood by reference to FIGS. 8b and 8c.

Referring to FIG. 8b, there is illustrated an aircraft 41 having a declined flight path angle, $-\gamma$, flying above a terrain profile 54 having a terrain obstacle 55. In practice, the aircraft controller limits the maximum aircraft flight path angle performance within the limits ($-\gamma_D$ and $+\gamma_C$). For the negative flight path angle demonstrated for the velocity vector of vehicle 41 in FIG. 8b, the associated clearance plane generated would resemble curve 49a.

It is to be observed from a comparison of clearance plane 49a and the terrain profile 54 (within the horizontal limits of clearance plane range) in FIG. 8b that the vertical height of the terrain is everywhere below that of the clearance plane. Hence, a measure of the minimum altitude difference ($\Delta h$) between the terrain and the clearance plane would produce a negative control signal, or a signal having a sense as to indicate that a dive maneuver may be safely continued. An alternative means of comparing the two profiles would be to divide the altitude difference ($\Delta h$) signal by the slant range of the obstacle producing the signal in order to produce a control signal indicative of the amount by which the dive angle may be increased (or decreased, depending upon the sense of $\Delta h$), $\Delta \gamma = \Delta h / R$, analogous to the method described in the above mentioned U.S. Patent application No. 221,653 filed Aug. 29, 1962 by James A. Moulton.

Yet another method of comparing the two profiles is measuring the slant-range difference ($\Delta R$) existing between the terrain profile and the clearance plane for a given line-of-sight originating at vehicle 41. Hence, a minimum difference between a slant range $R_1$ to the clearance plane and a greater range $R_2$ to the terrain (along like lines-of-sight) measured over the view-angles (lines-of-sight) of interest would indicate that the dive maneuver may be safely continued and the flight path dive angle increased (up to $-\gamma_D$).

When, of course, the control signal (produced by any of the methods described above) has a null amplitude, such condition indicates that no change ($\Delta \gamma$) need be made in the flight path angle. In order that such condition not be taken as a zero-trim angle signal, an integrator would preferably be employed in parallel with the output of the control signal output device in order to maintain a bias or trim signal corresponding to the desired command (i.e., desired flight path angle reference signal).

Such zero or null control signal would occur, for example, where vehicle 41 (in FIG. 8b) in response to a control signal (indicative, say of ($R_1-R_2$)), continued down a maneuver-limited flight-path (having a vertical descent $\Delta h$ and a forward transfer $\Delta R$) until the associated clearance plane 49'a generated for the flight path angle of the vehicle (now positioned at point 41') touches upon or is tangent to the terrain obstacle 55. Such a condition (e.g., profile range $R'_1$ equals terrain range $R'_2$ in FIG. 8b) produces a minimum downward maneuver signal (e.g., the safest downward maneuver signal) of zero. After such time, as the vehicle continues its descent, some forward range point of the terrain will be less than the corresponding range to the clearance plane (along the same line of sight). Therefore, the sense of the control signal will change, indicating that the flight path angle should be correspondingly changed (e.g., the negative flight path angle, $-\gamma$, should be decreased by some maximum amount, $+\Delta \gamma_{max}$), whereby the flight profile may be safely extended.

An alternate situation demonstrating the effect of vehicle flight path angle, $\gamma$, upon the clearance template employed, is shown in FIG. 8c.

Referring to FIG. 8c, there is illustrated a terrain profile 54 similar to that of FIG. 8b, with point 56 designating the position of an aircraft. For a flight path angle indicated by the direction of dotted arrow 57, the corresponding clearance plane generated for the vehicle is illustrated by dotted line 49b. The minimum distance between the clearance plane 49b and the terrain profile 54 is ($R_3-R_4$), where the terrain slant range distance ($R_4$) is greater than the corresponding clearance plane slant-range distance ($R_3$), (measured along the same line-of-sight from vehicle position 56). Such condition indicates that the vehicle is at a range greater than the minimum range at which a maneuver-limited pull-up could be performed whereby the terrain obstacle could still be safely avoided. Such condition further indicates that the vehicle may yet fly lower or closer to the terrain. Accordingly the negative sense condition of ($R_3-R_4$)$_{MIN}$ indicates that a dive maneuver ($-\Delta \gamma$) should be initiated for a vehicle at position 56 and having a flight path angle indicated by the slope of dotted arrow 57 in FIG. 8c.

For an alternate flight path angle indicated by the direction of solid arrow 58 in FIG. 8c, the corresponding clearance plane generated for the vehicle is illustrated by curve 49c. The maximum positive difference between the terrain profile slant range ($R_4$) and the corresponding clearance plane slant range ($R'_3$) is ($R'_3-R_4$), where the terrain slant range ($R_4$) is less than the clearance plane slant range ($R'_3$), (measured along the same line-of-sight from vehicle position 56). [At view angles of much greater inclination, the difference ($R_3-R_4$) may be positive but of lesser magnitude, or may even be negative. Accordingly, such view angles would not be determinative of the maximum upward maneuver condition required for assurance of safe terrain clearance.]

Such positive sense condition of ($R'_3-R_4$)$_{MAX}$ indicates that a positive change of flight path angle ($+\Delta \gamma$) is required in order to avoid a terrain obstacle.

Hence, by maneuvering a vehicle located at position 56 in FIG. 8c so as to vary the vehicle flight path angle (or inclination of the velocity vector), a control signal can be generated which is indicative of a desired change ($\Delta \gamma$) in the flight path angle ($\gamma$).

From the foregoing description of FIGS. 8a, 8b, and 8c, it is to be appreciated that employing the described control signal in a flight control system in such a fashion as to tend to drive the control signal to null, a vehicle controlled thereby will tend to follow a terrain profile within preselected acceleration and flight path angle maneuver limits. However, the bi-polar analog signals employed for such purpose will indicate, alternatively, a minimum dive command and maximum climb command whereby the controlled vehicle may safely avoid the worst terrain obstacle, in effecting such terrain-following mission.

Figure 12:
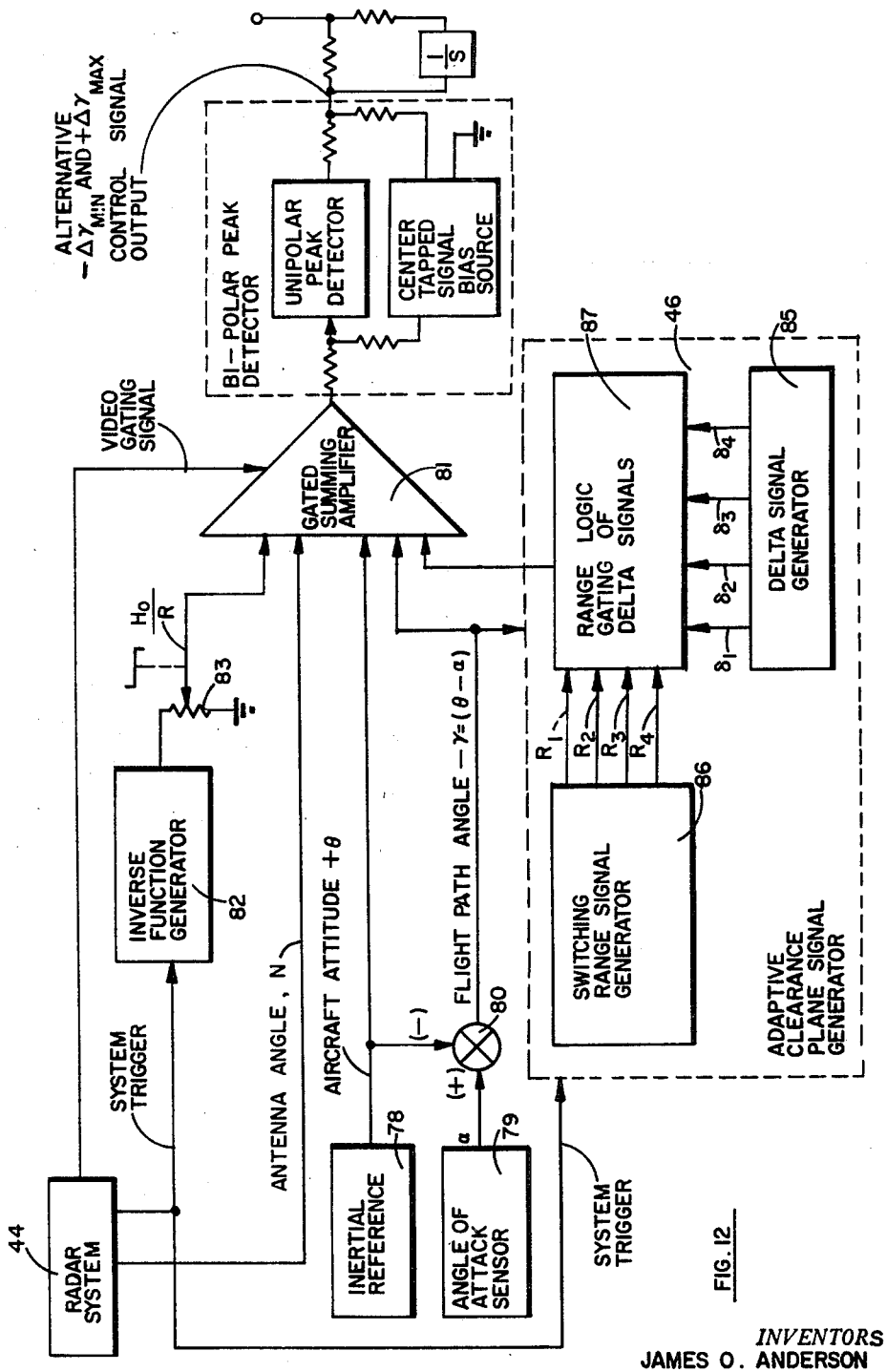
FIG. 12 is a block diagram of a concept of the invention.

As will be shown, the function of the adaptive clearance plane signal generator of FIG. 12, is to continuously bias the computed flight path change, $\Delta \gamma$, or control signals of a conventional flat clearance plane or ski-toe clearance plane type terrain-avoidance system, in order to provide improved control signals for terrain-following control purposes.

As is appreciated from FIG. 8, a preferred clearance surface will provide a means of control during pull-up if the clearance surface is permitted to remain stationary in space at the location where a terrain obstacle penetrated the clearance surface. Where, therefore, the vehicle varies its flight path angle $\gamma$, to follow the ideal (maneuver-limited) flight path toward the terrain obstacle, it is only necessary to vary the clearance surface as a function of flight path angle. Then, the obstacle will always be on (not above nor below) the clearance surface, as long as the vehicle flies the ideal flight path. Any deviation in flight path angle will appear as a corresponding deviation of the terrain obstacle from the clearance surface, represented by a phase-sensitive (bi-polar) control signal.

The ideal clearance surface or control surface during a pull-up maneuver or in a climb requires that a pull-over command or pull-over program be initiated at such a time or range distance from the terrain obstacle as to cause the vehicle to pull-over along the ideal flight profile, or flight path. This is done by the generation of an additional bias or correction representing a control surface (having a radius of curvature equal to the turn-down radius $R_{TD}$) emanating from the terrain obstacle and curving down tangent to the vehicle flight path. The occurrence of the point of tangency is the position at which the pull-over maneuver should be initiated, and the additional control surface generated serves to bend the clearance surface over in a climb as a function of vehicle flight path (climb) angle.

By means of the adaptive clearance plane and control system described, bi-polar control signals may be generated to control an aircraft to fly up or down. Also, by means of the elevation of the extreme forward end of the clearance plane, the aircraft receives terrain profile deviation signals (in response to distant terrain) of such a sense as to prevent the vehicle from prematurely "flying up." Also, by lowering the clearance plane at forward ranges close-in to the aircraft and as a function of negative or diving flight path angles $(-\gamma)$, control signals may be generated representing pull-up maneuvers not exceeding preselected maneuver-limits of the vehicle, whereby the vehicle may more safely and confidently be made to perform a terrain-following mission.

This adaptive clearance surface, or bias, generated by signal generator 46 in FIG. 7, may be represented analytically by expressions for the vertical angle $\gamma$, between a point on the clearance surface and the horizontal, measured from the controlled vehicle; and the range R from the controlled vehicle to such point on the control surface, employing (1) the instantaneous vehicle flight path angle $\gamma$, (2) vehicle forward velocity U, (3) assigned incremental normal acceleration limits, $a_u$ and $a_d$, and (4) assigned maximum climb and dive angles, $+\gamma_c$ and $-\gamma_d$. In other words, for a preselected set of vehicle performance parameters, the function $\delta$ vs. R is generated as a function of $\gamma$. The clearance surface is treated as separate curves or equations, which equations are mechanized by the computer element or function generator 46 of FIG. 7.

Figure 6:
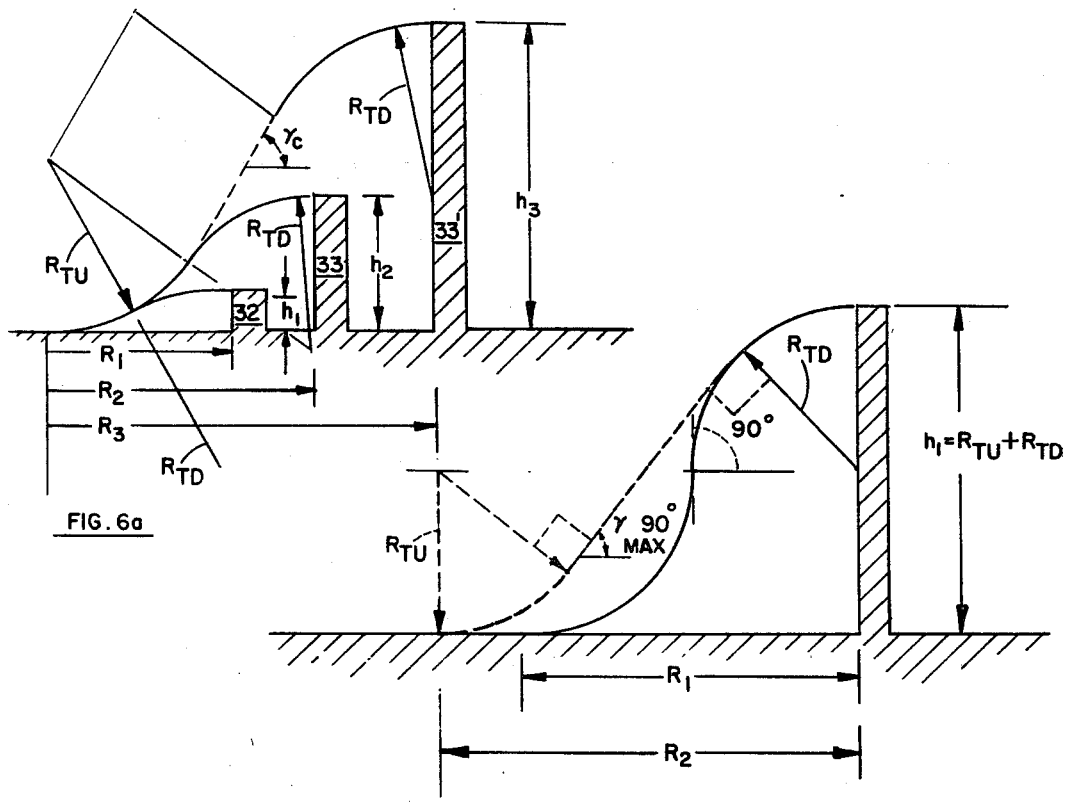
FIGS. 6a and 6b are illustrations of the effect of flight-path angle-limiting upon an acceleration-limited flight profile.

The desired flight profile to be generated for the approach to an obstacle during level flight of the vehicle has been shown in FIG. 6 to be a preselected pull-up acceleration and successive pull-down acceleration, while the slant range to the terrain at which the pull-up maneuver is initiated is a function of the relative height of the terrain obstacle. Such flight profile is seen to be comprised of two mutually-tangent circular sections, a first section having a radius equal to the pull-up radius, $$R_{TU} = \frac{U^2}{a_u}$$

and the second section having a radius equal to the pull-down radius, $$R_{TD} = \frac{U^2}{a_d}$$

Now, a plot of obstacle height versus range from the obstacle at which pull-up must be initiated describes a clearance surface. Such surface (for a level flight path, $\gamma=0$) resembles a segment of a circle having a radius equal to the sum of the pull-up and pull-down radii $(R_{TD}+R_{TU})$.

(The clearance plane indicating the range at which the push-over maneuver must be initiated will be described more fully hereinafter.)

The clearance surface during a dive is a segment of a circle having a radius equal to the pull-up radius $R_{TU}$ of the vehicle. As the projected flight path reference and clearance plane (as a function of range) approach the horizontal ($\gamma_{ref}$ or $\delta=0$), then the extension of the curve resembles the clearance plane for the pull-up from level flight situation, previously described. The complete spatial representation of the pull-up control surface is shown in FIG. 9, corresponding to the successively higher obstacles illustrated in FIG. 6, and the successively greater ranges for which the pull-up maneuver from the horizontal ($\gamma=0$) must be initiated. Points 66, 67, 68 and 69 represent obstacles above horizontal flight path point 70. The radial range from horizontal point 70 to each of successive heights 66, 67, 68 and 69 is determined only by $R_{TU}$, $R_{TD}$, and $+\gamma_c$. Hence, the locus of points illustrated describes a control curve, which may also be described analytically in terms of an associated vertical view angle $\delta_i$ for each value of range, $R_i$.

Similarly, for adaptation of the clearance surface during pull-up ($0<\gamma<+\gamma_c$), generation of the control surface requires that a pull-over command be initiated so as to cause the vehicle to pull-over to the ideal flight profile over the obstacle. Such control surface emanates from the vehicle at the turn-down radius of curvature $R_{TD}$, projects forward therefrom and terminates tangentially at the previously-described climb control surface illustrated in FIG. 9. The tangential point occurs at an obstacle height (e.g., at a view angle $\delta$ and slant range R) about which, if a controlling (highest) obstacle existed, a pull-over maneuver would be performed. In other words, as the climbing vehicle approaches the top of the obstacle, at a flight path angle $\gamma$, a pull-over maneuver would be initiated when the view angle and range of the top of the obstacle approached the computed view angle and range point. The locus of such points for a range of vehicle flight angles ($0<\gamma<+\gamma_c$) describes the required control surface.

The approach to a terrain obstacle during the vehicle climb, and the initiation of the pull-over maneuver in response to the coincidence of the terrain obstacle with the control surface are shown in FIGS. 10a, b, c.

Referring to FIGS. 10a, b, and c, there are illustrated three successive positions respectively of a vehicle over an ideal climb flight profile. There is provided a terrain profile 54 having a terrain obstacle 55. Curve 71 describes an ideal flight profile comprising a pull-up maneuver to a pull-over point 72 and then a pull-over maneuver to the top of obstacle 55. Curve 73 represents the pull-up clearance control or plane similar to the pull-up control surface described by points 66, 67, 68, 69 and 70 in FIG. 9. Point 74 in FIG. 10a represents a position of a vehicle along the ideal flight profile 71 and below the pull-over point 72, and curve 75 emanating from position 74 represents a control curve having a radius of curvature $R_{TD}$ and being tangent to first climb clearance plane 73 at point 76. The position of the tangent point 76 below, and at a shorter range than, the upper extremity of the controlling terrain obstacle 55, indicates that the aircraft is to continue to employ the first climb control surface 73.

FIG. 10b illustrates that the point of tangency is coincident with the terrain obstacle, indicating that the position of the aircraft (point 72) is at that point on the flight profile at which the turn-down acceleration maneuver is to be initiated (and the turn-down control surface 75 employed, in lieu of the first climb control surface 73).

FIG. 10c illustrates that the point of tangency of curve 75 to curve 73 is above, and at a further range than, obstacle 55, indicating that the position 74" of the controlled vehicle is past the point 72 at which the pullover maneuver is initiated. Accordingly, the terrain following control system will continue to use the pull-over control surface 75" and will continue the turn-down acceleration or pull-over maneuver.

The additional control surface 75 of FIG. 10 is employed in conjunction with the first control surface in climbs.

When the vehicle passes over the terrain obstacle, the vehicle is controlled by the sense of the difference between the terrain profile and the control surface. In other words, when all terrain is below the clearance plane (say, curve 49a in FIG. 8b), then the sense of the control signal directs the vehicle to change its flight angle ($\gamma$) by a negative amount ($-\Delta\gamma$), the vehicle controller being "$-g$" limited and dive-angle limited so as to prevent the vehicle from exceeding predetermined dive maneuver limits.

These curves of ($\delta$ vs $R$, $\gamma$) are generated in function generator 46 in FIG. 7. Accordingly, the analytical descriptions or equations for these curves are herein described; and analog or equivalent devices such as function generator means for providing electrical signals indicative of such curves will also be fully illustrated and described hereinafter.

Figure 11:
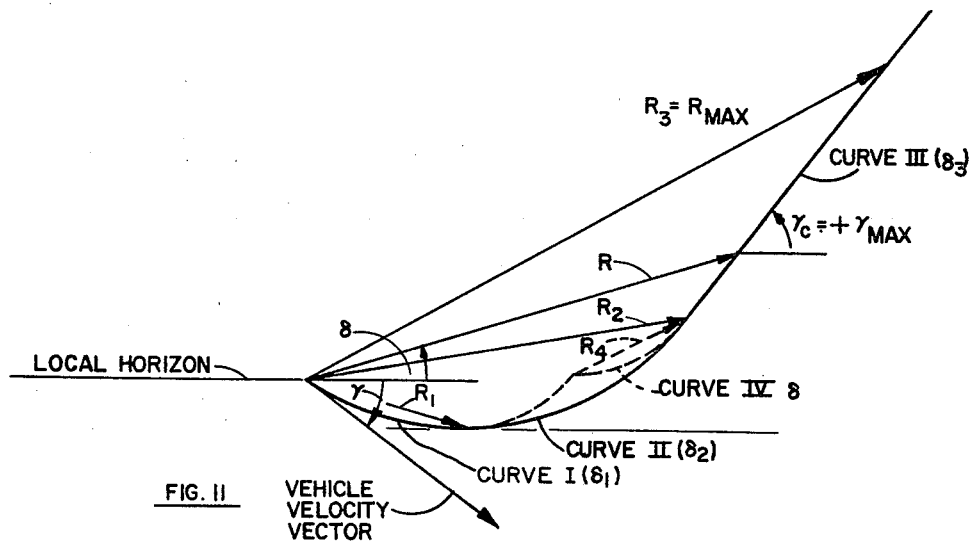
FIG. 11 is an illustration of the full control surface or clearance profile synthesized by the device of the invention.

The control surface is deemed, therefore, to be comprised of four curves, curves I, II, III and IV, as shown in FIG. 11, describing the bias signal, $\delta$ vs $R$ as a function of $\gamma$. In FIG. 11, Curve I represents that initial clearance plane shape and position applying in pull-up from a dive to a predicted horizontal flight path ($\gamma_D < \gamma < 0$) and is generated for ranges from zero up to the range ($R_1$) of the predicted horizontal position. Curve II represents that portion applying beyond range $R_1$ or in a pull-up during a climb ($0 < +\gamma < +\gamma_c$) and is generated up to the range $R_2$ at which maximum flight path angle $\gamma_c$ occurs. Curve III applies either beyond the range $R_2$ or when the vehicle is in a limiting climb ($+\gamma = \gamma_c$) or is clearing terrain obstacles within the maximum range or view-angle limits of the sensor. Curve IV applies in a climb ($+\gamma$) for initiating a pull-over maneuver at a range $R_4$ from a "worst" terrain obstacle. In other words, for a vehicle in a dive ($-\gamma$), curves I, II and III are generated within the range limits ($0-R_1$), ($R_1-R_2$) and ($R_2-R_3$) respectively; while in a climb, curves II, IV and III are generated within the range limits ($0-R_2$), ($0-R_4$) and ($R_2-R_3$) respectively. Accordingly, the control surface signal generator 46 of FIG. 7 is required to generate control surface signals indicative of curves I, II, III and IV of FIG. 11. A generalized block diagram of such structure is shown in FIG. 12.

Referring to FIG. 12, there is illustrated a more detailed block diagram of the system of FIG. 7. There is provided a radar system 44 for providing a video gating signal indicative of a radar return signal, and a signal indicative of the target angle, N relative to the FRL of the controlled vehicle in which such system is installed. In an on-boresight system, such angle may be indicative of a variable antenna angle N(t), or in an off-boresight system might be indicative of the sum of an antenna angle $N_0$ and a target angle off-boresight $\beta$.

There is further provided an inertial reference 78 such as a vertical gyro for providing signals indicative of the inertial attitude $\theta$ of the vehicle FRL, and an angle-of-attack sensor 79 for providing a signal indicative of the angle of the vehicle velocity vector relative to the vehicle FRL. Combining the outputs of sensors 78 and 79 by means of signal combining means 80, a signal is provided which is indicative of $\gamma$, the flight path angle of the vehicle relative to the inertial reference. This signal may be fed on line 84 to summing amplifier 81. Combining the radar system view angle signal N and the output signal $\theta$, by means of a gated summing amplifier 81, provides a resulting view angle signal referenced to the same inertial reference as the vehicle flight path, $\gamma$.

The summing amplifier 81 is gated by the radar return or receiver signals, to provide gated output signals indicative of the direction of the radar return which produces the gating signal.

An inverse function generator 82 is responsively connected to the system trigger of the radar system 44 to provide signals to summing amplifier 81 which vary inversely with elapsed time. Since the time of occurrence of the signal return or gating signal from radar system 44 subsequent to the occurrence of the system trigger is indicative of the range or distance of the target causing such return, the gating of the output of function generator 82 by gated means 81 produces a gated signal component indicative of $1/R$, the inverse range of the target or terrain. A potentiometer 83 or like device attenuates or scales the output of generator 82 by a fixed amount indicative of a desired perpendicular clearance distance $H_0$, to provide a signal level indicative of the ratio $H_0/R$. Such signal represents the small angle approximation of a vertical clearance angle to be maintained relative to the sensed terrain profile in order to provide the desired perpendicular clearance distance $H_0$. Hence, the output signal provided by gating the sum of the above described inputs to amplifier 81 is indicative of the sensed terrain profile relative to the desired clearance distance, $H_0$.

In addition to provision for generating a signal indicative of the sensed terrain profile, there is further provided in FIG. 12 means 46 for generating signals indicative of the reference or control profile of FIG. 10 and responsive to the system trigger of radar 44 and the flight path angle ($\gamma$) signal of summing means 80. Such signals are fed to gated summing amplifier 81 for biasing the terrain profile signals, whereby the output of summing means 81 is indicative of the difference between the observed terrain profile and the maneuver-limited reference profile.

The maneuver-limited reference profile of FIG. 11 has been described in terms of the coincidence of the profile with flight-limiting terrain features. However, this is to be understood as not affecting the flight-safety and effectiveness of the control signals thus generated by gated amplifier 81, because the clearance angle bias $H_0/R$ signal is also combined at the input of amplifier 81, in generating the control signal output therefrom.

Control surface generator means 46 is comprised of a delta signal generator 85, range signal generator 86, and logic gating means 87 responsive to generators 85 and 86 for providing a bias signal indicative of the shaped control surface. Such signal may be generated as a function of elapsed time (or range time) subsequent to the system trigger, and therefore be indicative at the gated amplifier of specific combinations of bias angle $\delta$ and range R.

Delta signal generator 85 accordingly generates $\delta_1$, $\delta_2$, $\delta_3$, and $\delta_4$ signals indicative of Curves I, II, III and IV respectively of FIG. 11. Range signal generator 86 generates signals indicative of the range limits $R_1$, $R_2$, $R_3$ and $R_4$ of FIG. 11. Logic gating means 87 employs the sense of the vehicle flight angle ($\gamma$) indicated by element 80 and the range limits computed by range signal generator 86 to gate the delta signals, whereby the desired output of signal device 46 is indicative of the desired maneuver-limited control profile.

Exemplary embodiments of elements 85, 86 and 87 of the control surface signal generator 46 represent analogs of the equations or analytical descriptions of the parameters of the curves of FIG. 11. Accordingly an analytical description of such curves is described herein in connection with FIGS. 13, 14, 15, and 16, after which exemplary detail embodiments of elements 85, 86 and 87 will be described more fully herein.

Figure 13:
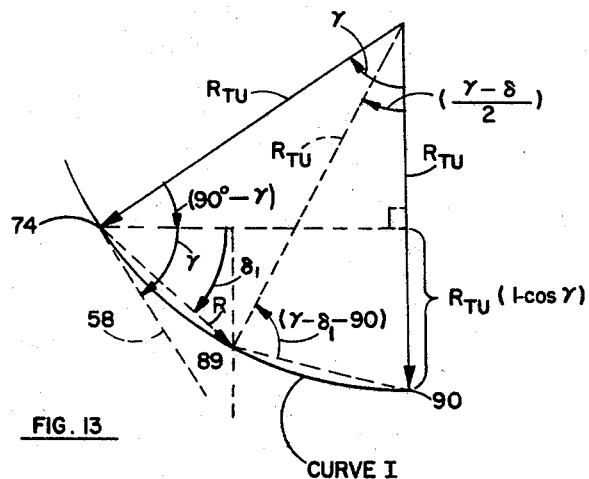
FIG. 13 is an illustration of the geometry of curve I of FIG. 11.

Referring to FIG. 13, there is illustrated the clearance plane applicable to a maneuver-limited vehicle, performing a pull-up maneuver from a dive to a horizontal flight path ($+a_u$ for $-\gamma_D > -\gamma > 0$), corresponding to curve I of FIG. 11. Point 74 corresponds to a position of a controlled vehicle, line 58 being tangent to the the vehicle velocity vector at point 74 and at an angle, $-\gamma$. Arc 89 describes the projected vehicle flight path, being an arc tangent to the vehicle velocity vector and having a radius of curvature equal to the pull-up radius $R_{TU}$. R represents the slant range from the vehicle position 74 to a point along the projected flight path 89 (for the preselected pull-up acceleration maneuver), and $\delta_1$ is the view angle to such range point, measured vertically from the local horizon.

Observing that the inscribed triangle described by the two radii ($R_{TU}$) and the chord R in FIG. 13 is an isosceles triangle, a perpendicular from the center of the arc to the chord is a perpendicular bisector of chord R. Accordingly, the expression for the slant range R of the clearance plane can be written as a function of twice the expression for one-half a chord length $\frac{1}{2}R$:

$$R = 2R_{TU} \sin(\delta_1 - \gamma) \quad (8)$$

Recalling that in a practical case small angle approximations apply, Equation 8 can be rewritten as follows:

$$R = 2R_{TU}(\delta_1 - \gamma) \quad (9)$$

Solving for the view angle, $\gamma$, as a function of range, R:

$$\delta_1 = \frac{R}{2R_{TU}} + \gamma \quad (10)$$

The region for which Equation 10 applies is for values of slant range (R) from zero up to the value $R_1$, corresponding to the predicted horizontal position 90. The value for $R_1$ as determined from the trigonometric law of sines, is:

$$R_1 = 2R_{TU} \sin\frac{-\gamma}{2} \approx T_{TU}(-\gamma) \quad (11)$$

Where the speed (U) of the controlled vehicle is variable, Equations 10 and 11 may be rewritten, substituting $U^2/a_u$ for $R_{TU}$:

$$\delta_1 = \frac{Ra_u}{2U^2} + \gamma = K_{\delta_1} \frac{R}{U^2} + \gamma \quad (12)$$

$$R_1 = \frac{U^2}{a_u}\gamma = K_{R_1} U^2 \gamma \quad (13)$$

where:

$$K_{\delta_1} = \frac{a_u}{2}$$

and $$K_{R_1} = \frac{1}{a_u}$$

Hence, the expression for $\delta_1$ vs. R for curve I applies during dive angles ($-\gamma$) for the region ($0 < R < R_1$):

$$\delta = \delta_1(R) \Big] \begin{matrix} R = R_1 \\ R = 0 \end{matrix} \quad (14)$$

It is to be noted that the control surface described by such function is coincident with the shape of the maneuver-limited flight profile.

Figure 14:
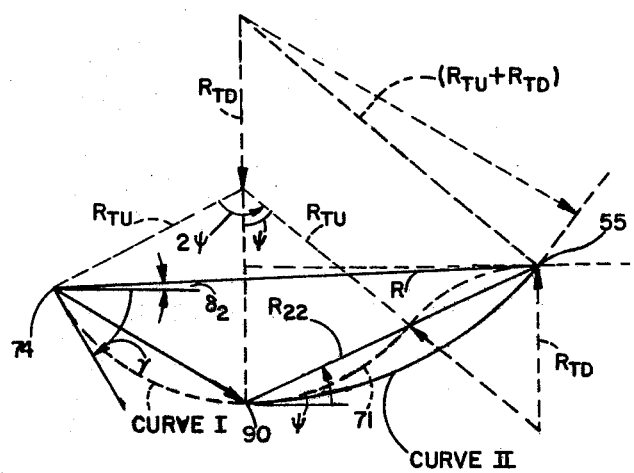
FIG. 14 is an illustration of the geometry of curve II of FIG. 11.

That part of the control surface to be generated for forward ranges in excess of the limit range $R_1$ is shown in FIG. 14.

Referring to FIG. 14, there is illustrated an extension of the control surface of FIG. 13, and which is an application of the principle discussed in connection with the description of FIG. 9. FIG. 14 illustrates the view angle $\delta_2$ with the associated shortest or closest range R to which a maneuver-limited diving vehicle may approach a terrain obstacle 55 of a given relative height (indicated by the positive value of view angle ($+\delta_2$)) before initiating a pull-up maneuver (and subsequent pull-over maneuver), indicated by profile 71. Such range R is observed to be a function of both $R_1$ (the range to a predicted pull-up to a horizontal flight path position 90), and $R_{22}$, the performance range from the predicted horizontal position to a given obstacle height, required by a given set of acceleration maneuver limits (represented by turn radii $R_{TU}$ and $R_{TD}$).

The relationship $\delta_2$ vs. R as a function of flight path angle ($\gamma$) can be derived from the expression for the horizontal and vertical components R(H) and R(V) respectively of the range vector, R:

$$R(H) = R \cos \delta_2 = R_1 \frac{\cos \gamma}{2} + R_{22} \cos \psi \quad (15)$$

$$R(V) = R \sin \delta_2 = R_1 \sin \frac{\gamma}{2} + R_{22} \sin \psi \quad (16)$$

From Equation 11 for FIG. 13, it is recalled that $$R_1 = 2R_{TU} \sin\left(\frac{\gamma}{2}\right) \approx R_{TU}\gamma$$

Further, it is to be observed from FIG. 14 that the expression for $R_{22}$ may be developed similarly as the expression for R of FIG. 13 (in Equation 8) as follows:

$$R_{22} = 2(R_{TU} + R_{TD}) \sin \psi \quad (17)$$

Substitution of the above expression for $R_1$ and $R_{22}$ in Equations 15 and 16, squaring such equations, employing the identity ($1 = \cos^2 \psi + \sin^2 \psi$), and simultaneous solution thereof yields the following result:

$$\frac{R_{TD}}{R_{TU}} \sin \delta_2 + \sin(\delta_2 - \gamma) = \frac{R}{2R_{TU}} - \frac{R_{TD}}{R}(1 - \cos \gamma) \quad (18)$$

Substituting $U^2/a_u$ and $U^2/a_d$ for $R_{TU}$ and $R_{TD}$ respectively, where the speed, U, of the vehicle is a variable, and solving for $\delta_2$:

$$\delta_2 = \left[\frac{1}{1 + \frac{a_u}{a_d}}\right]\left[\frac{Ra_u}{2U^2} - \frac{U^2\gamma^2}{Ra_d^2} + \gamma\right]$$

The region for which Equation 19 applies is during a dive ($-\gamma$) for values of slant range R between $R_1$ (defined by Equation 11 as the distance to the predicted horizontal position 90 during a pull-up) and a predicted forward range $R_2$ (within which a maximum climb angle $+\gamma_c$ would occur in the course of the pull-up maneuver). Such maximum range limit $R_2$ at which the maximum climb angle would occur, may be determined from FIG. 14 as follows:

$$R_2 = \left\{\left[\frac{U^2\gamma^2}{2a_u} + U^2\left(\frac{1}{a_u} + \frac{1}{a_d}\right)\frac{\gamma_c^2}{a}\right]^2 + \left[\frac{U^2}{a_u}\gamma + \left(\frac{1}{a_u} + \frac{1}{a_d}\right)\gamma_c\right]^2\right\}^{1/2} \quad (20)$$

Where $R_{TU} \approx R_{TD}$, the expression for $R_2$ may be simplified by neglecting the higher order terms of a Maclaurin expansion of such expression, as follows:

$$R_2 = \frac{U^2}{a_u}[2\gamma_c - 2\gamma + C_1\gamma^2 + C_2\gamma^3 + \ldots] \quad (21)$$

$$R_2 \approx \frac{2U^2}{a_u}[\gamma_c - \gamma] \quad (22)$$

Where the speed U, is assumed to be constant, then the expressions for $R_2$ and $\delta_2$ (Equations 22 and 19, respectively) would be correspondingly simplified.

Hence, the expression for $\delta_2$ vs. $R$ for curve II applies for the region ($R_1 < R < R_2$):

$$\delta = \delta_2(R) \Big]_{R=R_1}^{R=R_2} (\text{for} -\gamma_D > -\gamma > 0) \quad (23)$$

That part of the control surface to be generated for forward ranges in excess of the limit range $R_2$, is shown in FIG. 15.

Referring to FIG. 15, there is illustrated an extension of the control surface of FIG. 14, representing the effect of employing a preselected climb angle limit, $+\gamma_c$ (illustrated in FIG. 9), and corresponding to curve III of FIG. 11.

The relationship $\delta_3$ vs $R$ as a function of flight path angle $(\gamma)$ may be derived from the horizontal and vertical components of the slant range R to the climb-angle limited clearance surface, similarly as the development of the relationship $\delta_2$ vs $R$ in Equation 19, as follows:

$$R_H = R \cos \delta_3 = R_1 \cos\frac{\gamma}{2} + R_{33} \cos \Psi \quad (24)$$

$$R_V = R \sin \delta_3 = R_1 \sin\frac{\gamma}{2} + R_{33} \sin \Psi \quad (25)$$

Equation 11 may be substituted for the term $R_1$.

The expression for $R_{33}$ may be developed from FIG. 15 as follows:

$$R_{33} = (R_{TU} + R_{TD}) \frac{\tan \frac{\gamma_c}{2}}{\cos \psi - \frac{\sin \psi}{\tan \gamma_c}} \quad (26)$$

Substituting and combination yields the following result:

$$\sin(\delta_3 - \gamma_c) = \frac{-R_{TU}[1 - \cos(\gamma - \gamma_c)] + R_{TD}(1 - \cos \gamma_c)}{R} \quad (27)$$

Employing the small angle approximation, and substituting $U^2/a_u$ and $U^2/a_d$ for $R_{TU}$ and $R_{TD}$ respectively (where the speed (U) is assumed to be variable), the expression for $\delta_3$ may be written as follows:

$$\delta_3 = \gamma_c - \frac{U^2}{2R}\left[\frac{(\gamma - \gamma_c)^2}{a_u} + \frac{\gamma_c^2}{a_d}\right] \quad (28)$$

The region for which Equation 28 applies is for values of slant range $R$ between $R_2$ (defined by Equation 22 and the maximum range of interest ($R_3$), nominally selected as five miles for present day high-performance aircraft applications.

Hence, the expression for $\delta_3$ vs $R$ for curve III applies for the region ($R_2 < R < R_3$):

$$\delta = \delta_3(R)\Big]_{R=R_2}^{R=R_3} (\text{for } +\delta) \quad (29)$$

That part of the control surface generated during a climb $(+\gamma)$ for the initiation of a pull-over maneuver is shown in FIG. 16.

Referring to FIG. 16, there is illustrated an auxiliary control surface for initiating pull-over maneuvers from a climb ($0 < +\gamma < +\delta_c$) or positive flight path angles, in accordance with the principle discussed in connection with FIGS. 10a, 10b, and 10c. The pull-over clearance surface or relationship of $\delta_4$ vs $R$, corresponding to curve IV in FIG. 11, may be derived from the geometric relations of FIG. 16a. The tangency of surface 75 (generated by radius 92, $R_{TD}$) with the pull-up clearance surface 91 generated by radius ($R_{TD} + R_{TU}$) represents point 76 of FIG. 10.

It is noted that the triangle formed by the closed figure of chord R and two contiguous radii $R_{TD}$ in FIG. 16b forms an isoceles triangle. Hence, a perpendicular from the apex thereof (at the center of curvature for $R_{TD}$) will be a perpendicular bisector of R. Therefore, it can also be demonstrated that the apex angle itself is bisected and equal to $\delta_4$. Accordingly:

$$\sin \delta_4 = \frac{\frac{1}{2}R}{R_{TD}} \quad (30)$$

Employing the small angle approximation:

$$\delta_4 = \frac{R}{2R_{TD}} \quad (31)$$

The region for which Equation 31 applies is for values of slant range R between zero and $R_4 = R_{TD}\gamma$, which upper limit corresponds to an obstacle of zero relative height or a limit value of zero for $\delta_4$. In other words, $$R_4 = R_{TD}\gamma \quad (31a)$$

Where the speed U of the controlled vehicle is considered to be a variable, the expressions for $\delta_4$ and $R_4$ be rewritten, substituting $U^2/a_d$ for $R_{TD}$.

Hence the expression for $\delta_4$ vs $R$ for curve IV applies for the region ($0 < R < R_{TD}$):

$$\delta = \delta_4(R)\Big]_{R=0}^{R=R_4} (\text{for } +\delta) \quad (32)$$

The equations of $\delta$ for curves I, II, III, and IV, and the range limits having been derived, and the limiting conditions of flight path angle ($\gamma$) indicated for such equations, detailed embodiments of the control surface signal generator 46 may be better appreciated.

Figure 18:
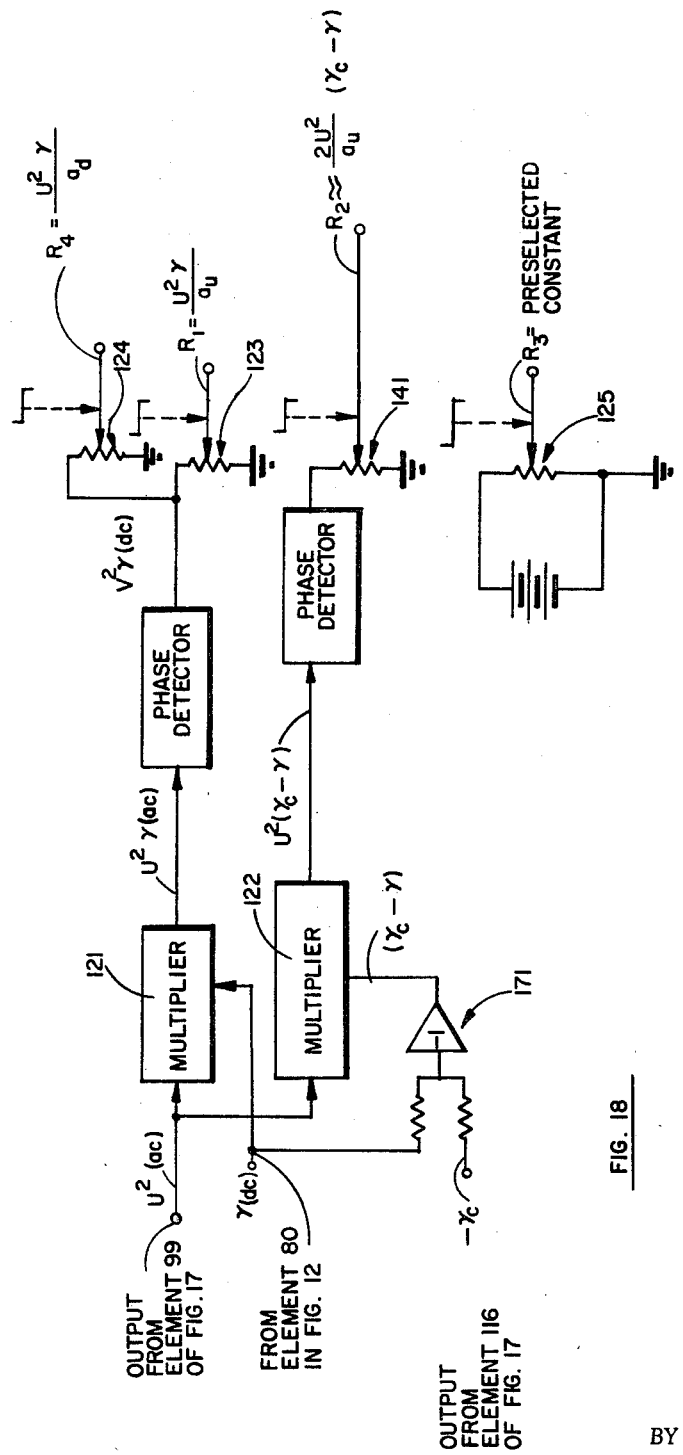
FIG. 18 is a block diagram of the range logic means for gating the delta signal generator of FIG. 12.
Figure 19:
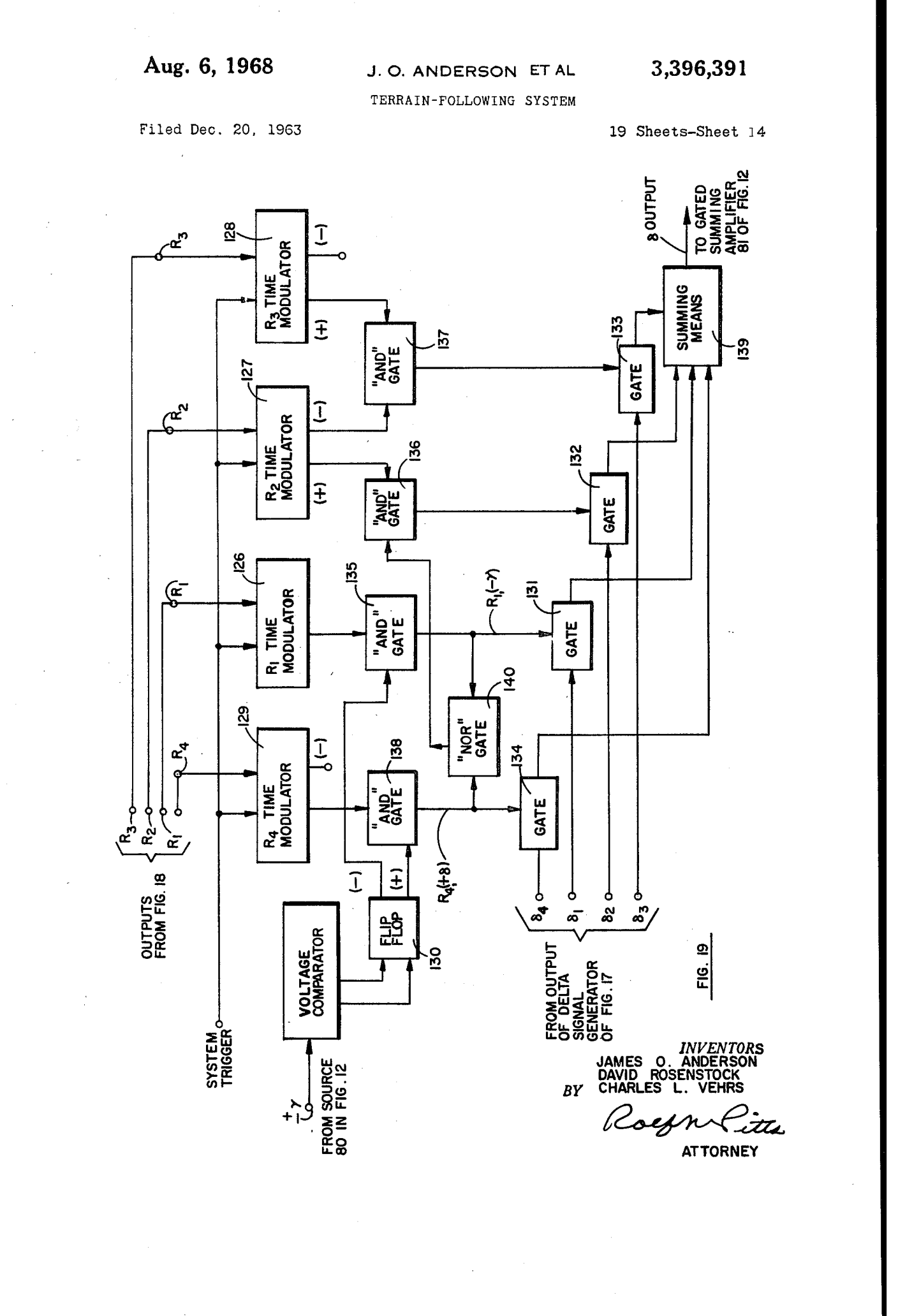

Preferred embodiments of the delta signal generator 85, range signal generator 86, and logic gating means 87 of the control surface generator 46 of FIG. 12 are shown in FIGS. 17, 18, and 19 for computing signal analogs of the expressions for the curves of FIG. 11, and including a consideration of the vehicle speed (U) as a variable.

Referring to FIG. 17, there is illustrated a preferred embodiment of the delta signal generator 85 of FIG. 12. There are provided a first, second, third and fourth output terminals 94, 95, 96 and 97 for providing output signals corresponding to $\delta_1$, $\delta_2$, $\delta_3$, and $\delta_4$ respectively. Suitable inputs to terminals 94, 95, 96, and 97 are generated as follows.

There is provided a range signal source 98 such as a ramp signal generator responsive to the system trigger of radar system 44 or like means well-known in the art for providing an analog signal, the amplitude of which is a function of radar range-time. There is further provided a signal-squaring circuit 99 such as a diode or like square-law detection means responsively connected to a velocity sensor 100 such as an airspeed meter for providing a signal indicative of the square of the speed of a vehicle-to-be-controlled. A first divider means 101 responsive to elements 98 and 99, is employed to provide a signal indicative of the ratio of range-time R divided by $U^2$, the square of the velocity. Such signal divider may be comprised, for example of two fast automatic gain control (FAGC) units, each responsively connected to the output of a mutually exclusive one of elements 98 and 99, the output of that FAGC unit 103 which is connected to element 99 being employed as a common automatic gain control signal for both of the FAGC units 102 and 103. In this way the output signal level of unit 103 tends to be mantained at a constant level, or the gain of unit 103 (and hence of unit 102) varies inversely with the amplitude of the velocity squared signal input from element 99. Hence, the output of FAGC unit 102 is indicative of the ratio $R/U^2$.

The output of amplifier 102 may be properly attenuated or scaled by gain adjusting means 104 such as a potentiometer, for providing adjustment of the signal in accordance with a preselected gain constant, $a_d$. In this way, the output of potentiometer 104 may be made indicative of the term $$\delta_4 = \frac{R a_d}{2U^2}$$

corresponding to Equation 31 for curve IV of FIG. 11.

Similarly, the output of divider 101 may be adjusted by second gain adjusting means 105 to provide a second signal indicative of the expression $R_{a_u}/2U^2$.

The output of potentiometer 105 is then combined with a signal indicative of the flight path angle $\gamma$ of a vehicle to be controlled by means of signal combining means 106. In this way, an output signal is provided, indicative of the term $(\delta_1 = R_{a_u}/2U^2 + \gamma)$, corresponding to Equation 12 and curve I of FIG. 11.

A second divider means 110 is responsively connected to range signal generator 98 and squaring circuit 99 for providing a signal indicative of the rtaio of velocity squared ($U^2$) divided by range (R). The output of second divider 110 is fed to a first and second multiplier 111 and 112 respectively. Interposed between multiplier 111 and divider 110 is gain adjusting means 113 such as a potentiometer which may be adjusted to provide a signal level indicative of the expression $U^2 a_u / R$. A second input of multiplier 111 is responsively connected to the signal source 80 indicative of flight path angle ($\gamma$). A squaring circuit 114 is interposed between source 80 and the second input to multiplier 111. Hence, the output of multiplier 111 is indicative of the term $U^2 \gamma^2 / 2 R a_d$.

The output of multiplier 111 is combined with the output of amplifier 106 by signal combining means. In this way, an output is provided, indicative of the term, $$\delta_2 = \left[\frac{1}{1+\frac{a_u}{a_d}}\right]\left[\frac{R a_u}{2U^2} - \frac{U^2 \delta^2}{R a_d^2} + \delta\right]$$

corresponding to Equation 19 and curve II of FIG. 11.

There is further provided bias means 116 for generating a signal indicative of a preselected maximum flight path angle, $\gamma_c$. Phase-inverting, signal squaring, attenuation means 117 is responsively connected to bias means 116 for providing a signal indicative of the constant $$\left(\frac{1}{a_u} + \frac{1}{ad}\right)\gamma_c^2$$

where $a_u$ and $a_d$ is a respective preselected pull-up acceleraion and push-over acceleration. A summing amplifier 118 is responsively connected to flight path angle signal source 80, signal squaring means 114 and phase-inverting means 117 for providing a signal indicative of the expression $$\left[\frac{(\gamma-\gamma_c)^2}{a_u} + \frac{\gamma_c^2}{a_d}\right]$$

The output of summing amplifier 118 is fed to a second input of multiplier 112. The output of multiplier 112 is then combined with the output of bias means 116 by means of a phase-inverting summing amplifier 120. In this way, an output signal is provided which is indicative of the expression, $$\delta_3 = \gamma_c - \frac{U^2}{2R}\left[\frac{(\gamma-\gamma_c)^2}{a_u} + \frac{\gamma_c^2}{a_d}\right]$$

corresponding to Equation 28 and curve III of FIG. 11.

An A-C multiplier 173 is interposed between the D-C output of range signal generator 98 and associated input to multiplier 102 for amplitude-modulating an A-C phase reference signal to provide an A-C analog signal suitable for use by the AGC input circuits of divider elements 101 and 110 while the use of such A-C reference signal as a phase reference by a phase detector 174 converts the A-C output of multiplier 102 back to a phase-detected or D-C output, where such conversion function is required or desired. A like phase-detector (not shown) may be similarly interposed at the output of each of multipliers 111 and 112 for signal conversion purposes, as is well understood in the art.

The range-limit signal generator of FIG. 12 is shown in FIG. 18.

Referring to FIG. 18, there is illustrated an exemplary embodiment of the range signal generator 86 of FIG. 12 for cooperation with the delta signal generator of FIG. 17. There is provided a first and second multiplier 121 and 122 commonly responsive to ($U^2$), the square of the velocity of a controlling vehicle. Multiplier 121 is further responsive to the flight path angle ($\gamma$) of a vehicle to-be-controlled, whereby the output of multiplier 121 is indicative of the product ($U^2\gamma$). First and fourth adjustable range signal attenuation means 123 and 124, respectively, are commonly responsive to multiplier 121 for providing respective output signals indicative of $$R_1 = \frac{U^2 \gamma}{a_u} \text{ and } R_4 = \frac{U^2 \gamma}{a_d}$$

corresponding to Equations 13 and 31a, respectively.

A signal corresponding to the maximum or preselected range limit $R_3$ is provided in FIG. 18 by a source 125 of an adjustable bias signal.

A signal indicative of the range limit $R_2$ of Equation 22 is provided at the output of a potentiometer 141. The input of potentiometer 141 is responsively connected to multiplier 122. A second input of multiplier 122 is connected to an inverter-summing amplifier or source 171 of FIG. 18.

Signal combining means 171, comprising an inverter-summing amplifier is responsively connected to a signal source 80 indicative of the vehicle flight path angle $\gamma$, and a signal source 116 indicative of a maximum or preselected flight path angle, $\gamma_c$. Hence, the output of multiplier 122 is indicative of the term $U^2(\gamma_c - \gamma)$. This signal may be suitably scaled by adjustment of potentiometer 141, whereby the output of potentiometer is indicative of the term $$\frac{2U^2}{a_u}(\gamma_c - \gamma)$$

corresponding to Equation 22.

The means for employing the range signals generated by the range signal generator of FIG. 18 for gating-on mutually exclusive delta signals generated by the delta signal generator of FIG. 17 is shown in FIG. 19.

Referring to FIG. 19 there is illustrated an exemplary embodiment of logic gating means 87 of FIG. 12 for cooperation with the delta signal generator of FIG. 17 and the range generator of FIG. 18.

There are provided first, second, third and fourth time-modulator or two-state signal devices 126, 127, 128 and 129 responsively connected to the system trigger and a mutually exclusive one of the four range limit signal outputs of the range signal generator shown in FIG. 18. The purpose of elements 126, 127, 128 and 129 is to provide a signal state having a duration corresponding to the range time interval occurring between the system trigger and the range-time represented by the corresponding one of range signal inputs $R_1$, $R_2$, $R_3$ and $R_4$ from the range limit generator of FIG. 18.

There is also provided means for generating two-state signals indicative of the sense of the flight path angle ($\gamma$) of the vehicle-to-be-controlled, comprising a flip-flop circuit 130 responsively connected to signal source 80 of FIG. 12. Gatings circuits 131, 132, 133 and 134 are interposed between signal combining means 139 and a respective one of the first, second, third and fourth output signals from the delta signal generator of FIG. 17. Associated with each of gates 131, 132, 133 and 134 is a corresponding "AND" gate 135, 136, 137 and 138 arranged for controlling "ON" a mutually exclusive one of the delta signal gates 131, 132, 133 and 134.

For example, first "AND" gate 135 is responsively connected to the output of flip-flop 130 indicative of flight path angle ($\gamma$) of a negative (−) sense, and is further connected to first time modulator 126, the output of gate 135 being operatively connected to drive gate 131. In this way the $\delta_1$ signal from the signal generator of FIG. 17 is turned "on" for negative flight path angles during the range time interval ($0<R<R_1$), to provide an input to summing means 139 corresponding to Equation 14.

Fourth "AND" gate 138 is responsively connected to that output of flip-flop 130 indicate of flight path angle ($\gamma$) of a positive ($+$) sense, and is further connected to fourth time modulator 129, the output of gate 138 being operatively connected to drive gate 134. In this way, the $\delta_4$ signal from the signal generator of FIG. 17 is turned "on" for positive flight path angles during the range time interval ($0<R<R_4$), to provide an input to summing means 139 corresponding to Equation 32.

Second "AND" gate 136 is responsively connected to second modulator 127 and a "NOR" gate 140. "NOR" gate 140, in turn, is responsively connected to the outputs of first and fourth "AND" gates 135 and 138. The output of second "AND" gate 136 is operatively connected to drive gate 132. In this way, the $\delta_2$ signal from the generator of FIG. 17 is turned "on" in conjunction with the "OFF" states of gates 131 and 134, but for a period limited by the "on" time of modulator 127. Hence, gate 136 provides an input to summing means 139 corresponding to Equation 23.

Third "AND" gate 137 is responsively connected to third modulator 128 and a "NOT" output of second modulator 127, whereby a driving signal is provided at the output of "AND" gate 137 during a time interval corresponding to the range time interval ($R_2<R<R_3$). The output of third "AND" gate 137 is connected to drive gate 133, whereby a delta signal is provided to summing means 139 corresponding to Equation 32.

Hence, it is to be appreciated that summing means 139 provides an output to gated summing amplifier 81 of FIG. 12 corresponding to the desired control surface or clearance profile for biasing the terrain profile clearance signals generated in FIG. 12. Therefore, an improved control signal is generated in FIG. 12 which is of especial utility for terrain-following missions of controlled vehicles.

Figure 20:
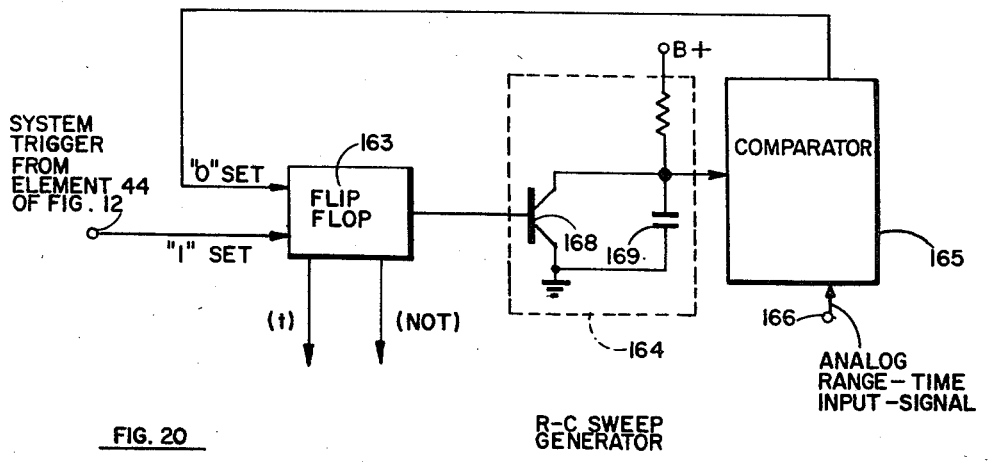
FIG. 20 is a schematic diagram of an exemplary time modulator.

An exemplary embodiment of the time modulators 126, 127, 128 and 129 used in FIG. 19 is shown in FIG. 20.

Referring to FIG. 20, there is illustrated an exemplary schematic diagram of a time modulator. There is provided a flip-flop 163 responsive to a system trigger for providing two two-state outputs of mutually exclusive states (the second output corresponding to a "NOT" signal). Responsively connected to the system trigger is an R-C sweep generator 164 for providing a ramp signal, the amplitude of which is indicative of the time elapsed since the occurrence of a system trigger input.

A comparator circuit 165 compares the output of the sweep generator 164 with a reference input signal (say, one of the range switching signals), to provide a feedback or reset signal of suitable polarity when the range sweep generator signal exceeds the amplitude of the range reference signal. The construction and arrangement of a voltage comparator circuit is well understood in the art, a circuit for comparing the magnitudes of two signals of opposite polarity for providing a bipolar output signal being illustrated, for example, at FIG. 6.27a on page 298 and Table 6.6 on page 428 of "Electronic Analog Computers" by Korn and Korn (second edition), published by McGraw-Hill (1956). The range input signal applied to terminal 166 (where of opposite sense as the range generator signal) cannot reset flip-flop 163. As the sweep generator signal increases in time to a magnitude in excess of the range-time reference signal, the sense of the sum thereof is reversed, and the reversed sense output of summing means 165, as fed back to flip-flop 163 serves as a reset signal. The resetting of flip-flop 163 grounds the base of transistor 168, thereby shorting the capacitor 169 of the R-C sweep generator 164 until the application of a subsequent trigger input to the "1" set input terminal of flip-flop 163.

Hence, the "on" state of the output of flip-flop 163 occurs for a time duration or interval, corresponding to the range time reference signal, after which the output of flip-flop 163 changes state. It is to be understood that such illustrated exemplary arrangement of FIG. 20 may be replaced by any equivalent functional means, as illustrated, for example, by element 26 in FIG. 4 of U.S. Patent 3,119,582 to Kaufmann.

The embodiment illustrated in FIGS. 17 and 18 for the delta and range signal generators 85 and 86 have employed a forward speed sensor to take into account variations in the speed of the vehicle-to-be-controlled. However, where the speed of the vehicle is reasonably constant, or where variations in the vehicle speed from a nominal speed can be ignored without appreciably affecting the utility of the device of the invention, the mechanization may be simplified. For example, the speed sensor 100 and squaring circuit 99 may be omitted from the embodiment of FIG. 17, and signal divider 101 of FIG. 17 can be replaced with a potentiometer for providing an adjustable attenuation $$\left(\frac{1}{U_0{}^2}\right)$$

of the range signal R to reflect a nominal speed $U_0$. Further, divider 110 in FIG. 17 could be omitted and the input terminal of potentiometer 113 and multiplier 112 connected to the inverse function ($1/R$) signal generator 82 of FIG. 12.

Further, while the function generator 46 of FIG. 12 has been illustrated in FIGS. 17, 18, and 19 as means for simulating the curve of FIG. 11, it is possible to employ alternate means for approximating such curve as a series of straight lines. For example, such curve may be approximately by several straight line segments, as shown in FIGS. 21a, 21b and 22.

Figure 21A:
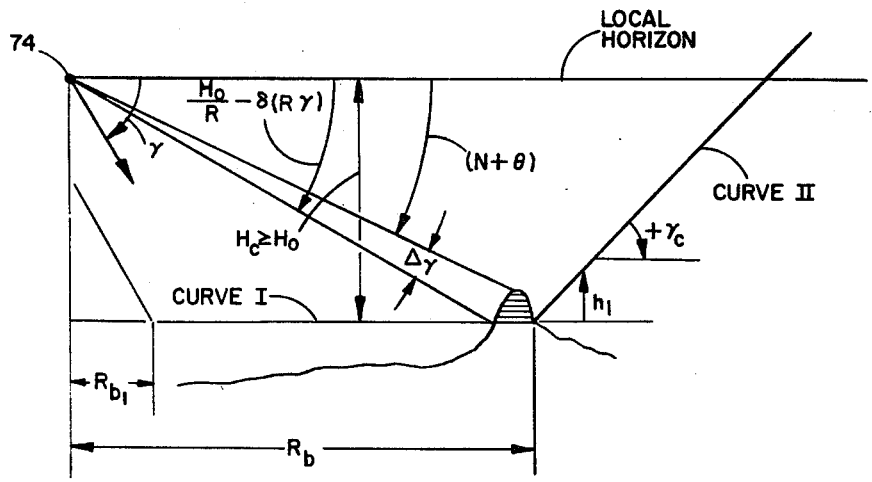
FIG. 21a is an illustration of a three-line approximation of the control profile or reference plane of FIG. 11 for a vehicle in a diving condition.
Figure 22A:
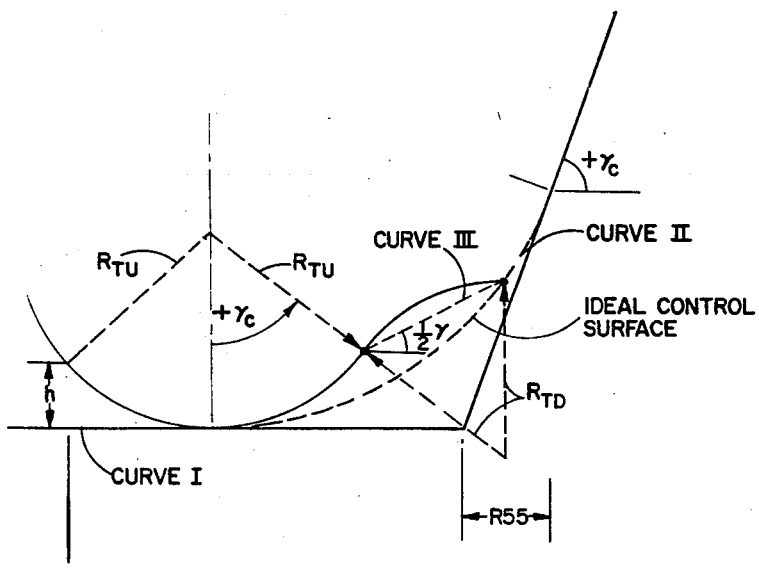
FIG. 22a is an illustration of the geometry of FIG. 21b.

Referring to FIG. 21a, there is illustrated a three-line approximation of the control profile or reference plane of FIG. 11 for a vehicle (at position 74) in a diving (negative flight path) condition. Such curve is comprised of a horizontal segment I and inclined second segment or ski-toe II contiguous with the first segment. The vertical distance ($h$) of the horizontal section below the vehicle and the slant range distance of the ski-toe are functions of the flight path angle ($\gamma$) and the performance limits ($R_{TU}$ and $R_{TD}$) of the controlled vehicle.

Figure 21B:
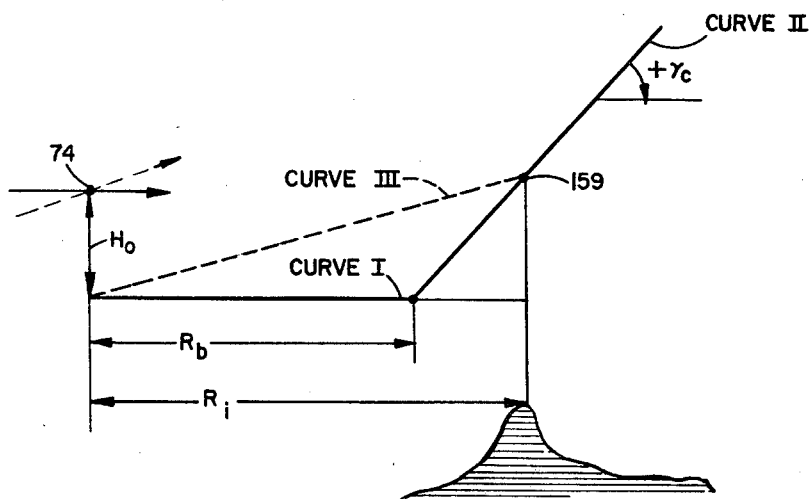
FIG. 21b is an illustration of a two-line approximation of the control profile or reference plane of FIG. 11 for a vehicle in a non-diving flight condition.

The profile control surfaces approximated for a vehicle in straight and level flight ($\gamma=0$) or in a climb (positive values for $\gamma$) are shown in FIG. 21b. For straight and level flight of the vehicle (indicated by the solid arrow), the horizontal segment I of the control surface is located below the vehicle by the desired clearance distance, $H_0$; and the ski-toe II is located forward of the aircraft at a range $R_b$ determined by the maneuver limits of the vehicle. For a vehicle in a climb (indicated by the dashed arrow in FIG. 21b), the control surface may be represented by an inclined line segment III which intersects the ski-toe II at point 159.

Such approximations of the control surface are adequate for vehicles of relatively slow speeds and short turning radii ($R_{TD}$ and $R_{TU}$).

The equation of $\delta$ vs $R$ for segment I of FIG. 21a may be derived from the performance limits illustrated in FIG. 22.

Figure 22B:
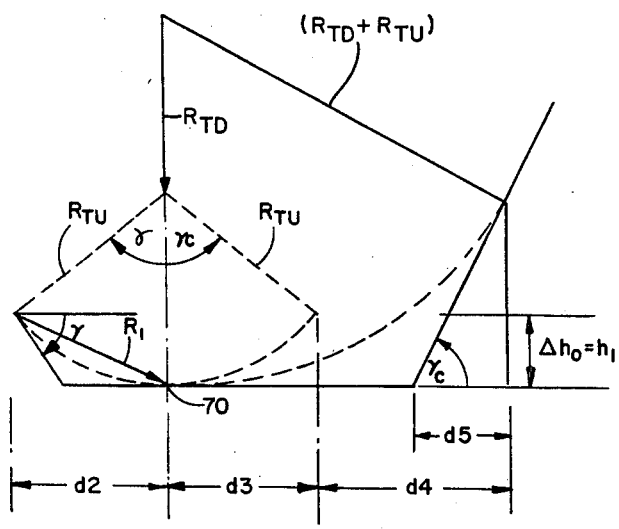

Referring to FIG. 22b the distance ($h$) represents the vertical distance of the vehicle above the predicted horizontal pull-out point 70, and may be described analytically as follows:

$$h = R_1 \sin \frac{\gamma}{2} \qquad (33)$$

Substituting Equation 11 into Equation 33:

$$h = 2R_{TU} \sin^2 \frac{\gamma}{2} \qquad (34)$$

Now, $\delta_1$, corresponding to curve I in FIG. 21a, may be defined as $h/R$.

Therefore:

$$\delta_1 = \frac{h}{R} = \frac{2R_{TU}}{R} \sin^2 \frac{\gamma}{2} \quad (35)$$

Using the small angle approximations ($\gamma^2/4$) for $\sin^2 (\gamma/2)$:

$$\delta_1 = \frac{R_{TU}\gamma^2}{2R} \quad (36)$$

Where the speed (U) of the vehicle is assumed variable, $U^2/a_u$ is substituted for $R_{TU}$, in Equation 36:

$$\delta_1 = \frac{U^2\gamma^2}{2a_u R} \quad (37)$$

Where the speed U (and hence the turn radius $R_{TU}$) is assumed constant, Equation 36 can be rewritten:

$$\delta_1 = \frac{K_1 \gamma^2}{R} \quad (38)$$

Hence, where $K_1 = R_{TU}/2$, the correction $\delta_1$ to be added to the clearance angle expression ($H_0/R$) is seen to be zero for level flight conditions ($\gamma = 0$) and increases for increasing (negative) flight path angles. In other words, the term $H_0/R$ is modified by a correction term $\Delta h/R$ as a function of path angle ($-\gamma$).

The distance or range limit $R_b$ to the intersection of curve I with ski-toe II is a function of flight path angle, and may be derived as the sum of the derivation for the several components comprising the segment $R_b$.

$$R_b = +d_2 + d_3 + d_4 + d_5 \quad (39)$$

$$d_2 = R_1 \cos \frac{\gamma}{2} \quad (40)$$

Substituting Equation 11 in Equation 40:

$$d_2 = 2R_{TU} \cos \frac{\gamma}{2} \sin \gamma/2 \quad (41)$$

Employing small angle approximations:

$$d_2 = -R_{TU} \sin \gamma \approx -R_{TU}\gamma \quad (42)$$

Similarly solving for $d_3$:

$$d_3 = 2R_{TU} \sin \frac{\gamma_c}{2} \cos \frac{\gamma_c}{2} \quad (43)$$

$$d_3 = R_{TU} \sin \gamma_c = \frac{U^2}{A_u} \sin \gamma_c \quad (44)$$

Solving for $d_4$:

$$d_4 = (R_{TD} + R_{TU}) \sin \gamma_c - R_{TU} \sin \gamma_c \quad (45)$$

$$d_4 = R_{TD} \sin \gamma_c = \frac{U^2}{a_d} \sin \gamma_c \quad (46)$$

Solving for $d_5$:

$$\frac{h_1}{d_5} = \tan \gamma_c \quad (47)$$

But $$h_1 = (R_{TU} + R_{TD})(1 - \sin \gamma_c) \quad (48)$$

Rearranging Equation 47:

$$d_5 = \frac{h_1}{\tan \gamma_c} \quad (49)$$

Substituting Equation 48 in Equation 49:

$$d_5 = (R_{TU} + R_{TD}) \left( \frac{1 - \sin \gamma_c}{\tan \gamma_c} \right) = (R_{TU} + R_{TD}) K_{\gamma_c} \quad (50)$$

Substituting Equations 42, 44 and 50 in Equation 39:

$$R_b = R_{TU}(\sin \gamma_c - \sin \gamma) + R_{TD} \sin \gamma_c - (R_{TU} + R_{TD}) K_{\gamma_c} \quad (51)$$

If $R_{TU}$ and $R_{TD}$ are assumed constant (e.g., speed U is assumed constant):

$$R_b = K_1 + K_{\gamma_1} \sin \gamma \approx K_1 + K_{\gamma_1}\gamma \quad (52)$$

where $$K_1 = R_{TU} \sin \gamma_c + R_{TD} \sin \gamma_c - (R_{TU} + R_{TD}) K_{\gamma_c}$$

and $$K_{\gamma_1} = -R_{TU}$$

Hence, for curve I in FIG. 21:

$$\delta = \delta_1 \Big|_{R=0}^{R=R_b} \quad (53)$$

Solving now for $\delta_2$, corresponding to curve II in FIG. 21:

$$\delta_2 = \frac{+h - h_1}{R} = \frac{h}{R} - \frac{h_1}{R} \quad (54)$$

Substituting Equation 35 in Equation 54:

$$\delta_2 = \delta_1 - \frac{h_1}{R}, \text{ where } -h_1 = \gamma_c(R - R_b) \quad (55)$$

where $$h_1 = \gamma_c(R - R_b)$$

Therefore:

$$\delta_2 = \delta_1 + \frac{\gamma_c(R - R_b)}{R} \quad (56)$$

$$\delta_2 = \gamma_c + \delta_1 - \frac{\gamma_c R_b}{R} \quad (57)$$

Substituting Equation 52 for $R_b$:

$$\delta_2 = \gamma_c + \delta_1 - \frac{\delta_c}{R}(K_1 + K_{\gamma_1} \sin \gamma) \quad (58)$$

$$\delta_2 = \gamma_c + \delta_1 - \frac{K_2}{R} + \frac{K_4 \gamma}{R} \quad (59)$$

$$(\delta_2 - \delta_1) = \gamma_c - \frac{K_3}{R} + \frac{K_3 \gamma}{R} \quad (59a)$$

Where:

$$K_2 = \gamma_c K_1$$
$$K_3 = \gamma_c K_{\gamma_1}$$

Hence, for flight path angles of zero or negative value:

$$\delta_2 = \delta(R)_2 \Big|_{R=R_b}^{R=R_{max.}} \quad (60)$$

For positive flight path angles (climb conditions), the lower range limit for $\delta_2$ (R) would represent the range $R_i$ at which the curve III intersects curve II (e.g., point 159 in FIG. 21b).

The function $\delta_3$ corresponding to the straight line segment or curve III in FIG. 21b, used in climbing ($+\gamma$) flight conditions in lieu of curve I, is represented analytically as a function of the flight path angle ($\gamma$):

$$\delta_3 = \frac{1}{2}\gamma \quad (61)$$

Such function applies for position flight path angles ($+\gamma$) up to the range $R_i$ at which curve III intersects curve II:

$$\delta = \delta_3(R) \Big]_{R=0}^{R=R_i} \quad (62)$$

However, in the mechanization or embodiment of the straight-line curve of FIG. 22, it is not necessary to compute the intersection range, $R_i$. Instead, it is sufficient to compare the computed angle ($\delta_3$) with the other angles ($\delta_1$ and $\delta_2$) generated, and employ the larger of them, as will be more fully explained in connection with FIGS. 23 and 24.

Figure 23:
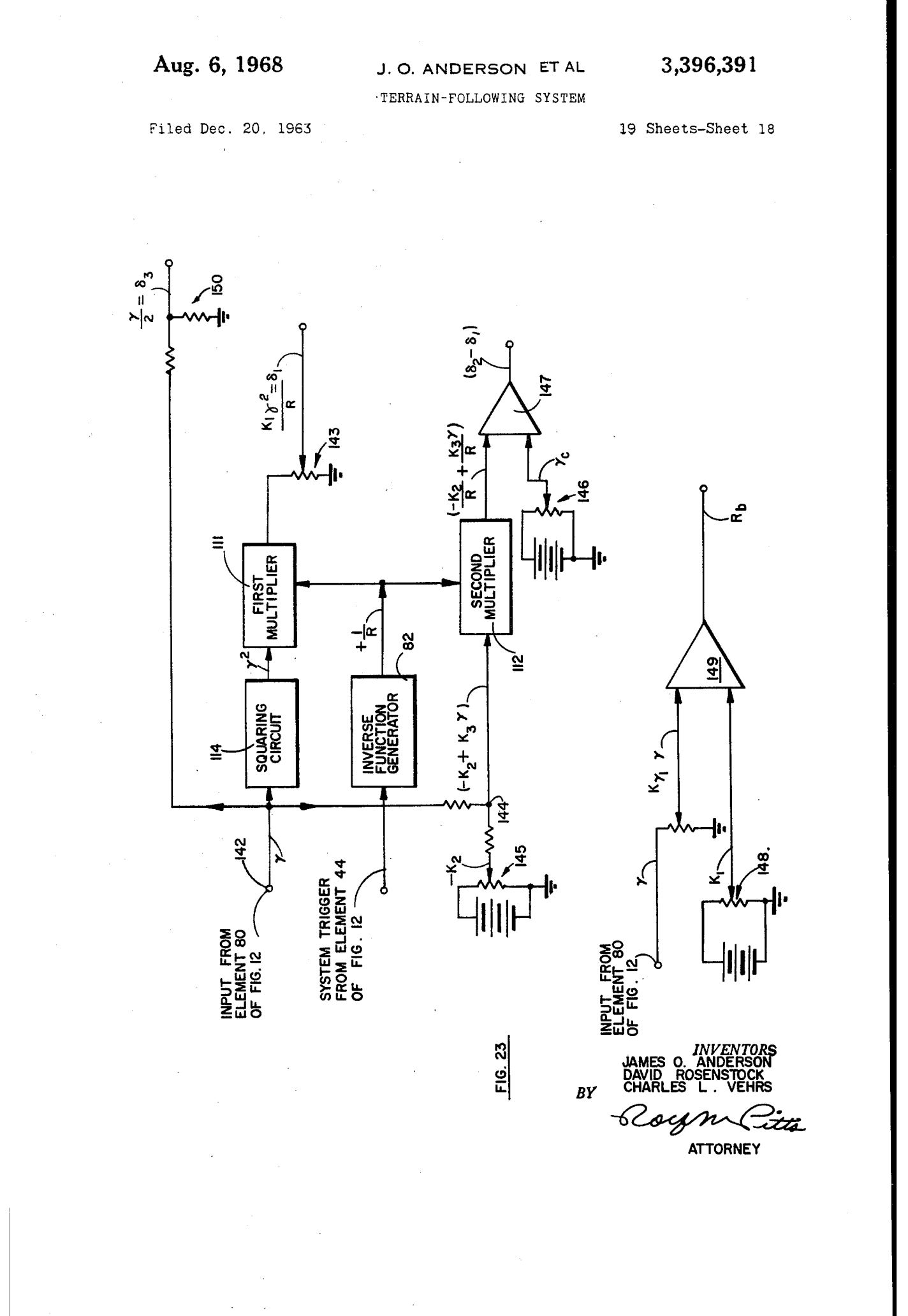

Referring to FIG. 23, there is described a signal generator (corresponding to elements 85 and 86 of FIG. 17) for generating analog signals corresponding to Equations 38, 52, 59a, and 61. There are provided first and second multipliers 111 and 112, a first input of each of multipliers 111 and 112 being commonly responsive to a signal source indicative of the inverse of cyclical time or radar range time, (1/R), such as element 82 of FIG. 12.

There is also provided an input terminal 142 adapted to be connected to the output of element 80 of FIG. 12. A signal squaring circuit 114 interconnects input terminal 142 with a second input of first multiplier 111. The output of first multiplier 111 is, hence, indicative of the product $\gamma^2/R$. The gain of such output is adjusted by gain-adjusting means such as a potentiometer 143 in accordance with the gain constant $K_1$ of Equation 38, whereby the output of potentiometer 143 is an analog of the expression for $\delta_1$, in Equation 38.

A second input of second multiplier 112 is responsively connected to the output of a summing means 144. A first and second input respectively of summing means 144 are responsively connected to input terminal 142 and a souce 145 of a first bias voltage. Hence, it is to be appreciated that the output of multiplier 112 is indicative of the function, $$\left(\frac{-K_2}{R}+\frac{K_3\gamma}{R}\right)$$

A second source 146 of an adjustable bias signal is provided, for generating a signal indicative of the preselected flight path angle limit, $+\gamma_c$. The output of summing means 147 is therefore indicative of the expression $(\delta_2-\delta_1)$ of Equation 59a.

A voltage divider network 150 is responsively connected to input terminal 142 to provide a signal indicative of $\gamma/2$, corresponding to $\delta_3$ of Equation 61.

The range limit signal $R_b$, corresponding to Equation 52 is generated at the output of a summing amplifier 149 by combining the $\gamma$ signal input from element 80 (of FIG. 12) with a bias signal from an adjustable bias signal source 148. The relative gains of the two inputs may be adjusted by means known in the art, such as potentiometers to achieve the relation $(K_1 \div K\gamma_1\gamma_1)$, corresponding to Equation 52.

The $(\delta_1)$, $(\delta_2-\delta_1)$, $(\delta_3)$ and $(R_b)$ signals generated by the embodiment illustrated in FIG. 23 are employed by signal logic means shown in FIG. 24 to synthesize the straight line approximation of the control surface illustrated in FIGS. 21 and 22.

Referring to FIG. 24, there is illustrated signal summing means 151 responsively connected to the outputs of potentiometer 143 and summing means 147 of FIG. 23. Interposed between the output of element 147 (of FIG. 23) and the associated input to summing amplifier 151 is signal gating means 152. The control input of gate 152 is responsively connected to the "NOT" output of a time modulator 153. Time modulator 153 is responsively connected to the system trigger of element 44 (in FIG. 12) and to the range limit signal source 149 (of FIG. 23). Hence, gate 152 is turned "OFF" for radar range times corresponding to ranges less than the range limit $R_b$ (of FIG. 22), being turned "ON" for range times equal to or greater than $R_b$.

By means of the above arrangement, the output of amplifier 151 is indicative of $\delta_1$ for ranges up to $R_b$ and is indicative of the sum of $(\delta_1)$ and $(\delta_2-\delta_2)$, (corresponding to $(\delta_2)$ of Equation 59), for ranges greater than $R_b$.

The $\delta_3$ analog signal generated by element 150 in FIG. 24 is gated "on" in response to signals indicative of flight path angles ($\gamma$) of the position (+) sense. Such gating is accomplished by means of a signal gate 159 having a control input connected to signalling means 154 sensitive to output signals from element 80 (of FIG. 12) indicative of flight path angles of a positive sense. Where the flight path angle signals are D-C analog signals, such device may be comprised, for example, of a diode or unidirectional conducting means for conducting only D-C analog signals of a preselected polarity or sense. The $\delta_3$ signal output from gate 159 is next compared with the output of summing means 151, and that one of them having the larger amplitude transmitted to output terminal 155. Such comparison is achieved by diode logic network 170.

Because the $\delta_3$ signals are proportional to the flight path angle $\gamma$, and are transmitted by gate 159 only for flight path angles of positive (+) sense, such comparison need only be made between signals of like sense. Accordingly, a diode 156 is conductively connected between the unipolar D-C output of element 159 and common output terminal 155. A second similarly poled diode 157 is connected between the output of amplifier 151 and output terminal 155. Hence, inputs of like sense to diodes 156 and 157 will tend to cause the output of each of diodes 156 and 157 to back-bias or cut-off the other diode. Hence, only that input of positive sense which is larger, is transmitted, the diode associated with the smaller input being back-biased to cutoff.

When the flight path angle ($\gamma$) changes sense (e.g., to negative (−) values), then gate 159 no longer provides a $\delta_3$ output signal. However, the sense of the ($\delta_1$ or $\delta_2$) signal may (for small ranges, $R\rightarrow 0$) also change sense. Therefore, unidirectionally conductive means is also provided for conducting $\delta_1$ or $\delta_2$ signals of such reverse sense. Such means may be comprised of a separate diode circuit interconnecting the output of amplifier 151 and output terminal 155, having a diode 158 reversely poled relative to diode 157.

Hence, it is to be appreciated that analog signals are generated at terminal 155 (of FIG. 22) indicative of the function $\delta$ vs$_0$ R described in FIGS. 21a and 21b, corresponding to Equations 53, 60 and 62 and approximating the control surface illustrated in FIG. 11. Accordingly, terminal 155 provides an output to gated summing amplifier 81 of FIG. 12 corresponding to the desired control surface or clearance profile for biasing the terrain profile signals generated in FIG. 12.

Although the embodiment of element 46 (of FIG. 12) shown in FIGS. 24 and 23 does not employ a speed sensor and ancillary signal processing equipment for compensating for the effect of changes in vehicle speed (U), e.g., changes from an assumed or reference speed upon the turning radii ($R_{TU}$ and $R_{TD}$), such compensation may be included, if desired, as taught in connection with the description of the embodiment illustrated in FIGS. 17, 18 and 19.

Element 46 of FIG. 12 has been described, thus, as means for generating a compensating signal for biasing the terrain avoidance signal $H_0/R$ by an amount $\Delta h/R$ as an automatic function of flight path angle ($\gamma$). Also, such compensation signal is seen to increase the maximum clearance reference $$\frac{H_0+\Delta h}{R}$$

at short ranges for negative flight path angles ($-\gamma$), corresponding to the initial loss of altitude predicted for a pull-up maneuver from such diving flight condition. Further, such compensating signal is seen to be a masking signal indicative of a ski-toe at maximum ranges, for preventing early or premature "fly-up" cues in response to distance terrain, the range of the ski-toe being automatically adjusted as a function of the flight path angle ($\gamma$) of the vehicle to be controlled. For example, the forward range of such ski-toe is increased for negative flight path angles ($-\gamma$), corresponding to the additional forward distance required by the vehicle to effect a "fly-up" maneuver from an initial diving condition. Still further, the output of element 46 in FIG. 12, combined with the terrain avoidance input signals to gated amplifier 81 in FIG. 12 are employed to generate bi-polar signals, whereby control of a vehicle so as to tend to maintain a null control signal, will allow a safe and reliable performance of a terrain-following mission by such controlled vehicle.

While analog computing means have been employed in the illustrated embodiments of the invention, it is clear that equivalent digital computing means may be employed to process digitized signals, to achieve a similar result or function. Further, while the illustrated embodiments have provided angular ($\Delta\gamma$) control signals as outputs, the concept of the invention is not so limited, and range-difference ($\Delta R$) control signals may be employed, indicating the difference between the range of the sensed terrain and the range of the control surface for a given look-angle ($N'+\theta$). Moreover, altitude difference ($\Delta h$) signals may be employed alternatively as control signals, indicating the difference in altitude between the altitude of the sensed terrain (at a given range) and the corresponding altitude of the control surface ($\Delta h = \Delta\gamma \times R$).

Although the invention has been illustrated and described in detail, it is to be clearly understood that the same is by way of illustration and example only and is not to be taken by way of limitation, the spirit and scope of this invention being limited only by the terms of the appended claims.

We claim:

1. In a vehicle-borne system employing a forward ranging sensor:
   means for generating a signal indicative of a preselected clearance distance of a vehicle from a sensed terrain obstacle; and
   means responsive to the flight path angle of said vehicle for varying said preselected clearance distance signal.

2. In a vehicle-borne system employing a forward raniging sensor:
   means responsive to a system trigger of said sensor for generating a signal indicative of a preselected clearance distance as a function of range-time; and
   means responsive to the flight path angle of said vehicle for varying said indicated preselected clearance distance.

3. The device of claim 2, in which said second mentioned means includes means for increasing said indicated preselected clearance distance in response to negative flight path angles.

4. The device of claim 2 in which said second mentioned means includes means for increasing said indicated preselected clearance distance in response to negative flight path angles and decreasing said indicated preselected clearance distance in response to positive flight path angles.

5. In a vehicle, means for generating a first signal indicative of a prospective clearance distance of said vehicle from a sensed terrain obstacle, means generating a second signal indicative of preselected clearance distance of said vehicle from said sensed terrain obstacle, means responsive to the flight path angle of said vehicle for varying said second signal, and means for comparing said first signal and said varying second signal to provide a control signal for said vehicle.

6. The combination recited in claim 5 wherein is further included means for varying said second signal in accordance with the speed of said vehicle.

7. The combination recited in claim 5 wherein is further included means for varying said second signal in accordance with the range to said sensed terrain obstacle.

8. In a vehicle-borne system employing a forward ranging sensor:
   means including said sensor for generating a signal indicative of the range-distance and direction of a terrain obstacle;
   means responsive to a trigger signal of said sensor for generating a signal indicative of a preselected clearance distance as a function of range-time;
   means responsive to the flight path angle of said vehicle for increasing said indicative preselected clearance distance for negative flight path angles; and
   signal combining means responsive to said first, second and third mentioned means for providing bi-polar control signals indicative of the difference between the distance of said terrain obstacle and said corresponding clearance signal.

9. The device of claim 8 in which there is further provided biased peak-detecting signalling means for providing alternatively a control signal indicative of a maximum maneuver away from said obstacle and a control signal indication of a minimum maneuver toward said obstacle.

10. In a terrain sensing system employing a forward ranging sensor for sensing a terrain obstacle, the combination comprising:
    a signal source responsive to said sensor for generating a signal indicative of a preselected clearance distance to a sensed terrain obstacle as a function of the range-distance thereof;
    means responsive to negative flight path angles for increasing the clearance distance in accordance with the increasing vertical and horizontal distances required to effect a pull-up maneuver from a negative flight path angle; and
    bi-polar signalling means responsive to said first and second mentioned means for providing alternatively a "fly-up" and "fly-down" control signal, whereby a controlled vehicle is enabled to safely and effectively tend to follow a terrain profile.

11. The device of claim 10 wherein said signal source includes means for generating a bias as a preselected function of range time for preventing the generation of premature fly-up signals in response to maximum range terrain obstacles.

12. In a terrain sensing system employing a forward ranging sensor and means for providing a clearance distance signal indicative of a preselected clearance distance to a terrain obstacle, the combination comprising:
    means responsive to the negative flight path angles, in a controlled vehicle for increasing the preselected clearance distance in accordance with the increasing vertical distances required to effect a pull-up maneuver from a negative flight path angle;
    means responsive to the trigger of said sensor for generating a ski-toe signal or bias to the clearance distance signal for preventing premature fly-up signals in response to maximum range terrain obstacles, including means responsive to the flight path angle of a controlled vehicle for increasing the range of said ski-toe in response to negative flight path angles; and
    bi-polar signalling means responsive to said first and second mentioned means for providing alternatively a "fly-up" and "fly-down" control signal, whereby a controlled vehicle is enabled to safely and effectively tend to follow a terrain profile.

13. In a terrain sensing system employing a forward ranging sensor and a source of a clearance distance signal indicative of the ratio of a preselected clearance distance ($H_0$) divided by the range R to a sensed terrain obstacle, the combination comprising:
    means responsive to negative flight path angles of a controlled vehicle for increasing the preselected clearance distance ($H_0$) an amount ($+\Delta h_0$) in accordance with the increasing vertical distances required to effect a pull-up maneuver from a negative flight path angle;
    means responsive to the trigger of said sensor and the flight path angle of a controlled vehicle for generating a ski-toe signal or bias to the clearance distance signal for preventing premature fly-up signals in response to maximum range terrain obstacles, including means for increasing the range of said ski-toe in response to negative flight path angles; and
    bi-polar signalling means responsive to said first and second mentioned means for providing alternatively a "fly-up" and "fly-down" control signal, whereby a controlled vehicle is enabled to safely and effectively tend to follow a terrain profile.

14. In a terrain-clearance system for controlling a vehicle in accordance with a maneuver-limited flight profile, comprising first means for generating a signal indicative of a terrain profile, second means for generating a clearance plane signal indicative of said maneuver-limited flight profile, and third means for comparing said signals to provide a control signal indicative of the difference therebetween.

15. The device of claim 14 in which said third means includes means for peak detecting said difference for providing alternatively a maximum pull-up maneuver control signal and a minimum pushover maneuver control signal.

16. The device of claim 14 in which there is further provided fourth means for providing a bias signal of a first sense, unipolar peak-detecting means responsive to said third and fourth means for peak-detecting signals of the same sense as said first mentioned sense, fifth means for providing a second bias signal of like amplitude and opposite sense as said first bias signal, and signal combining means responsive to said peak detector means and said second bias means for providing alternatively a maximum control signal of one sense and a minimum control signal of a second sense.

17. In a terrain avoidance system of the type having a forward ranging sensor and terrain profile indicating means, improved clearance plane signal-generating means for cooperation therewith, comprising signal means responsive to vehicle flight path angle and slant range terrain distance for generating clearance plane signals indicative of a preselected pull-over acceleration maneuver, preselected pull-up acceleration maneuver and maximum climb angle, respectively;

logic means responsive to the sense of flight path angle for gating respective ones of said clearance signals; and generator means responsive to vehicle flight path angle for generating logic gating signals, said logic means being responsively connected to the outputs of said generator means.

18. The device of claim 17 in which said first mentioned means is comprised of first signal means for generating a signal indicative of the expression $$\left[\frac{R a_u}{2U^2} + \gamma\right]$$

second signal means responsive to said first means for generating a signal indicative of the expression $$\left[\frac{R a_u}{2U^2} - \frac{U^2 \gamma^2}{R a_d} + \gamma\right]$$

third signal means for generating a signal indicative of the expression, $$\gamma_c - \frac{U^2}{2R}\left[\frac{1}{a_u}(\gamma - \gamma_c)^2 + \frac{\gamma_c^2}{a_d}\right]$$

and fourth signal means for generating a signal indicative of the expression $$\frac{R a_d}{2U^2}$$

where:

$R$ = slant range distance to a point on the clearance plane
$\gamma$ = flight path angle of a vehicle-to-be-controlled
$\gamma_c$ = a preselected maneuver angle limit
$U$ = velocity of the vehicle-to-be-controlled
$a_d$ = preselected incremental pull-down acceleration maneuver limit, normal to the flight path of the vehicle-to-be-controlled
$a_u$ = preselected incremental pull-up acceleration maneuver limit, normal to the flight path of the vehicle-to-be-controlled.

19. The device of claim 18 in which said logic gating means is comprised of first gating means for gating-on said first signal means in response to flight path angles of a first sense during a first range time interval corresponding to ranges up to a first range limit $R_1$, third gating means for gating-on said third signal means during the time interval corresponding to the range interval commencing with a second range limit $R_2$ and terminating with a third range limit $R_3$, fourth gating means for gating-on said fourth signal means in response to flight path angles of a second sense during a fourth range-time corresponding to ranges up to a fourth range limit $R_4$, second gating means for gating-on said second signal means during a second range time interval corresponding to a range interval terminating at said second range limit $R_2$, and commencing at said first limit $R_1$ for positive flight angles of said first sense and at said fourth range limit $R_4$ during flight path angles of said second sense.

20. The device of claim 17 in which said generator means is comprised of first generator means for generating a first range limit signal indicative of the expression $$R_1 = \frac{U^2 \gamma}{a_u}$$

second generator means for generating a second range limit signal indicative of the expression $$R_2 = \frac{2U^2}{a_u}[\gamma_c - \gamma]$$

third signal generator means for generating a third range limit signal indicative of a preselected maximum range, $R_3$; and a fourth signal generator means for generating a fourth range limit signal indicative of the expression, $$R_4 = \frac{U^2 \gamma}{a_d}$$

21. The device of claim 17 in which said first mentioned means is comprised of means responsive to a radar system trigger signal for generating a first signal indicative of radar range-time;

means for providing a second signal indicative of the square of the velocity of a vehicle to-be-controlled;

first signal divider means responsive to said first and second signals for providing a first ratio output signal indicative of said range time divided by said square of the velocity;

first summing means responsive to said first ratio signal and a signal source indicative of the flight path angle of said vehicle to be controlled for providing a first output signal indicative of the sum of said first ratio and said flight path angle;

second signal divider means responsive to said first and second signals for providing a second ratio signal indicative of the ratio of said velocity squared signal divided by said range signal, first multiplier means responsively connected to said second signal divider and said flight path angle signal source, signal squaring means interposed between said flight path angle signal source and said first multiplier means;

second summing means responsively connected to said first summing means and said first multiplier means for providing a second output signal;

bias means for generating a signal indicative of a preselected maximum flight path angle;

phase-inverting attenuation means for generating a signal indicative of the ratio of said preselected flight path angle to a preselected normal acceleration;

third summing means responsive to said bias means, said phase-inverting attenuation means and said flight path angle signal source;

second multiplier means responsive to said third summing means and said second divider for providing a third output signal.

22. The device of claim 17 in which said generator means is comprised of multiplier means responsive to the flight path angle and source of signals the square of the velocity of a controlled vehicle for providing a first and fourth ($R_1$ and $R_4$) range limit signals indicative of the product of said angle of attack and square of said velocity, multiplier means responsive to said square of said velocity and a function of preselected acceleration limits and said flight path angle for providing a second range limit ($R_2$) signal, and bias signal means for providing a third range limit ($R_3$) signal indicative of a preselected maximum range.

23. In a terrain-avoidance system of the type having a forward ranging sensor and terrain-profile indicating means, improved clearance signal generating for cooperation therewith, comprising first and second multipliers, a first input of each of said multipliers commonly responsive to the reciprocal of cyclical range time ($1/R$), and the output of said first multiplier constituting a first output signal, an input terminal adapted to be connected to a source of a signal indicative of flight path angle of a vehicle-to-be-controlled, signal squaring means interconnecting said input terminal and a second input of said first multiplier;

a source of a first bias voltage;

signal combining means responsively connected to said input terminal and said first bias voltage means and having an output connected to a second input of said second multiplier;

a source of a second bias voltage;

signal summing means responsive to said second bias voltage to provide a second output signal;

voltage divider means responsive to said input terminal for providing a third output signal;

logic means responsive to the sense of said flight path angle for gating at least one of said output signals, ($\delta_1$), ($\delta_2-\delta_1$) and $\delta_3$; and generator means responsive to said flight path angle for generating a range gating signal, said logic means being further responsive to said range gating signal.

24. The device of claim 23 in which said logic means comprises means responsive to the system trigger of said forward ranging sensor and to said range gating signal for gating off said second signal during range times less than those corresponding to said range gating signal;

means for combining said first output signal and said gated second output signal to provide a combined signal;

means responsive to the sense of said flight path angle for gating said third output signal; and means for selectively transmitting the larger of said combined signal and said third output signal.

References Cited
UNITED STATES PATENTS 3,119,582   1/1964   Kaufman _____ 343—7
3,245,076   4/1966   Le Tilly _____ 343—7

RODNEY D. BENNETT, *Primary Examiner.*

T. H. TUBBESING, *Assistant Examiner.*

UNITED STATES PATENT OFFICE
CERTIFICATE OF CORRECTION

Patent No. 3,396,391                              August 6, 1968

James O. Anderson et al.

It is certified that error appears in the above identified patent and that said Letters Patent are hereby corrected as shown below:

Column 1, line 15, "armaments" should read -- armament --. Column 5, line 3, "$(+\Delta\gamma_2 > +\gamma_1)$" should read -- $(+\Delta\gamma_2 > +\Delta\gamma_1)$ --; line 33, "FIG. 5" should read -- FIG. 3 --. Column 12, line 48, "$(R_3-R_4)$" should read -- $(R'_3-R_4)$ --. Column 17, that portion of equation (11) reading "$T_{TU}$" should read -- $R_{TU}$ --. Column 19, that portion of equation (29) reading "$+$" should read -- $\mp$ --. Column 20, line 62, "mantained" should read -- maintained --. Column 21, line 13, "rtaio" should read -- ratio --. Column 23, line 5, "$(\mp)$" should read -- $(+)$ --. Column 24, lines 32 and 33, "approximately" should read -- approximated --.

Signed and sealed this 21st day of April 1970.

(SEAL)
Attest:

EDWARD M. FLETCHER, JR.                     WILLIAM E. SCHUYLER, JR.
Attesting Officer                            Commissioner of Patents